(12) United States Patent
Brothers et al.

(10) Patent No.: US 11,768,797 B2
(45) Date of Patent: Sep. 26, 2023

(54) PATH TRACING OF MATHEMATICAL PLOTS

(71) Applicant: Texas Instruments Incorporated, Dallas, TX (US)

(72) Inventors: Malgorzata Anna Brothers, Plano, TX (US); Michel Georges Stella, Dallas, TX (US); Brian Emilio Baldwin Cruzado, Aguascalientes (MX)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 588 days.

(21) Appl. No.: 16/677,412

(22) Filed: Nov. 7, 2019

(65) Prior Publication Data
US 2020/0151136 A1 May 14, 2020

Related U.S. Application Data

(60) Provisional application No. 62/758,201, filed on Nov. 9, 2018.

(51) Int. Cl.
*G06F 15/02* (2006.01)
*G06F 17/10* (2006.01)
*G06T 11/20* (2006.01)
*G06F 40/169* (2020.01)

(52) U.S. Cl.
CPC .......... *G06F 15/0225* (2013.01); *G06F 17/10* (2013.01); *G06F 40/169* (2020.01); *G06T 11/206* (2013.01)

(58) Field of Classification Search
None
See application file for complete search history.

(56) References Cited

U.S. PATENT DOCUMENTS

| | | | | |
|---|---|---|---|---|
| 4,794,553 A | * | 12/1988 | Watanabe | G09G 3/20 708/160 |
| 4,908,786 A | * | 3/1990 | Kuno | G06F 15/0225 708/171 |
| 10,346,135 B2 | * | 7/2019 | Clower | G06F 16/95 |
| 2004/0205547 A1 | * | 10/2004 | Feldt | G06F 40/169 715/201 |
| 2011/0261060 A1 | * | 10/2011 | Waibel | G06T 13/80 345/473 |

(Continued)

OTHER PUBLICATIONS

Center of Math, "TI-84 Plus Graphing Calculator Guide: Graphing Functions", Nov. 3, 2014, YouTube, <URL: https://www.youtube.com/watch?v=q1OEXc_Gio4>, retrieved Mar. 10, 2022 (Year: 2014).*

(Continued)

*Primary Examiner* — Christopher J Fibbi
(74) *Attorney, Agent, or Firm* — Charles F. Koch; Frank D. Cimino

(57) ABSTRACT

A method for path tracing of mathematical plots on a digital device is provided that includes receiving at least one mathematical expression on the digital device, and tracing a path of a plot of the at least one mathematical expression on a display screen coupled to the digital device, wherein tracing the path comprises displaying the path sequentially point by point as a value of an independent variable of the at least one mathematical expression changes over a domain of the independent variable.

22 Claims, 17 Drawing Sheets

(56) References Cited

U.S. PATENT DOCUMENTS

2012/0242690 A1* 9/2012 Yamaguchi ............. G06F 15/02
345/629
2014/0317570 A1* 10/2014 Endo ................... G06F 15/0225
715/833

OTHER PUBLICATIONS

Phillips, Emma, "Tracing a Polar Graph in Desmos", Jun. 24, 2016, YouTube, <URL: https://www.youtube.com/watch?v=d4INAW8Fz5w>, retrieved Feb. 3, 2023 (Year: 2016).*
"TI-Nspire™ CX II Handhelds Guidebook", Texas Instruments Incorporated, 2010-2019, pp. 1-95.
"TI-Nspire™ App for iPad® Guidebook", Texas Instruments Incorporated, 2011-2019, pp. 1-172.
"TI-Nspire™ CX Student Software Guidebook", Texas Instruments Incorporated, 2006-2019, pp. 1-547.
"TI-Nspire™ CX Premium Teacher Software Guidebook", Texas Instruments Incorporated, 2006-2019, pp. 1-621.

* cited by examiner

PATH TRACING OF MATHEMATICAL PLOTS

CROSS-REFERENCE TO RELATED APPLICATIONS

This application claims benefit of U.S. Provisional Patent Application No. 62/758,201 filed Nov. 9, 2018, which is incorporated herein by reference in its entirety

BACKGROUND

The curriculum for classes such as algebra, calculus, and physics includes mathematical concepts that become more and more complex as the classes progress. The curriculum can include studying, for example, functions, parametric equations, and/or polar equations, as well as other plot types with one independent variable. Understanding the graphical nature of such mathematical concepts is important as the graphs represent the physical or "real" nature of the concepts. Accordingly, the ability to compute and display such graphs is a desirable feature for educational use of devices such as handheld graphing calculators, tablets, laptops, and desktop computers as such functionality allows users to better understand and visualize the mathematical concepts.

SUMMARY

Embodiments of the present disclosure relate to methods and systems for path tracing of mathematical expressions. In one aspect, a method for path tracing of mathematical plots on a digital device is provided that includes receiving at least one mathematical expression on the digital device, and tracing a path of a plot of the at least one mathematical expression on a display screen coupled to the digital device, wherein tracing the path comprises displaying the path sequentially point by point as a value of an independent variable of the at least one mathematical expression changes over a domain of the independent variable.

In one aspect, a digital device is provided that includes a non-transitory computer-readable medium storing software instructions for path tracing of mathematical plots, wherein the software instructions include software instructions to receive at least one mathematical expression on the digital device, and to trace a path of a plot of the at least one mathematical expression on a display screen coupled to the digital device, wherein tracing the path comprises displaying the path sequentially point by point as a value of an independent variable of the at least one mathematical expression changes over a domain of the independent variable, and at least one processor coupled to the non-transitory computer-readable medium to execute the software instructions.

DETAILED DESCRIPTION

Figure 1A:
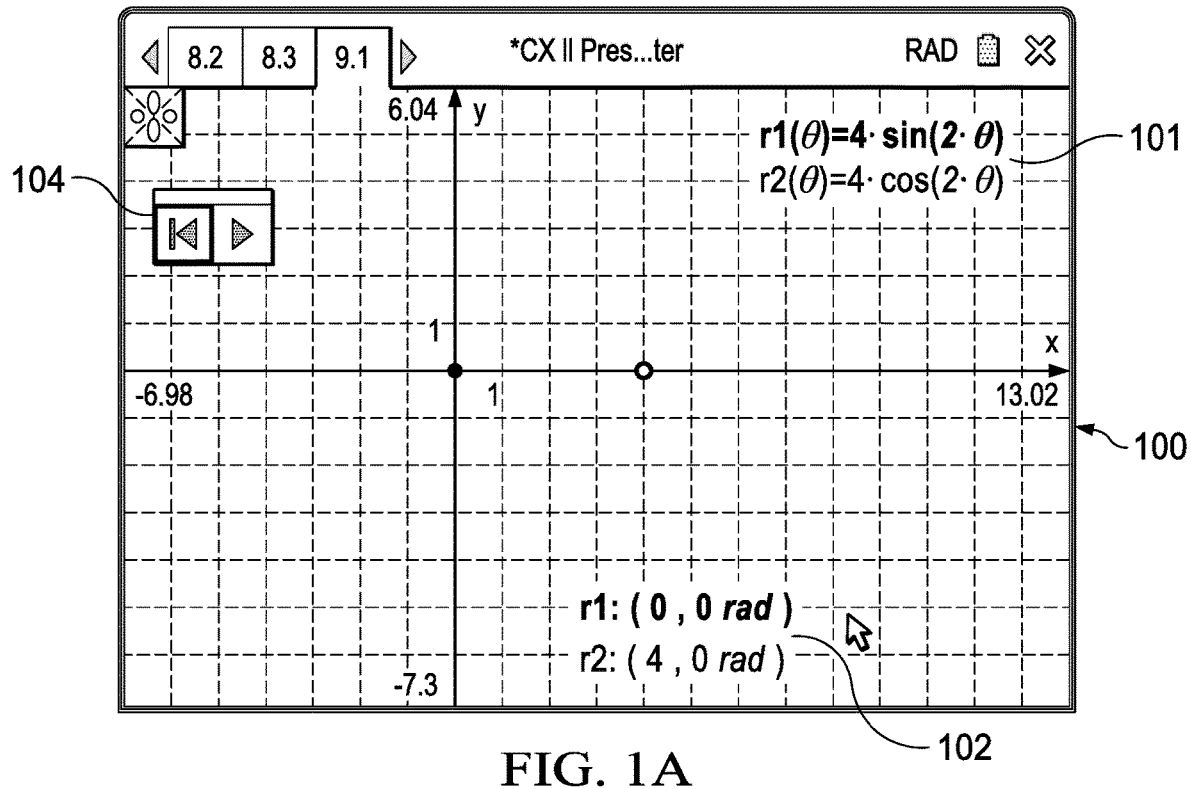
FIGS. 1A-1F are an example illustrating tracing of paths of polar plots on a digital device.
Figure 1B:
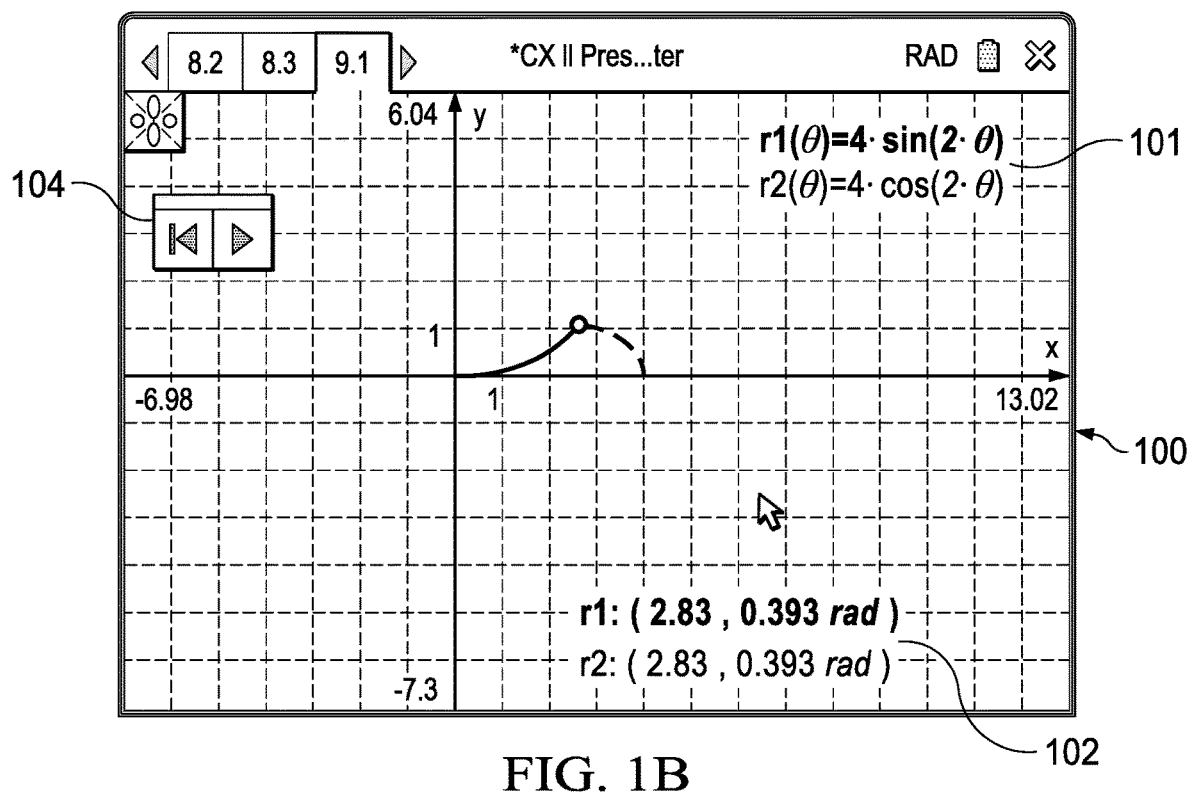
Figure 1C:
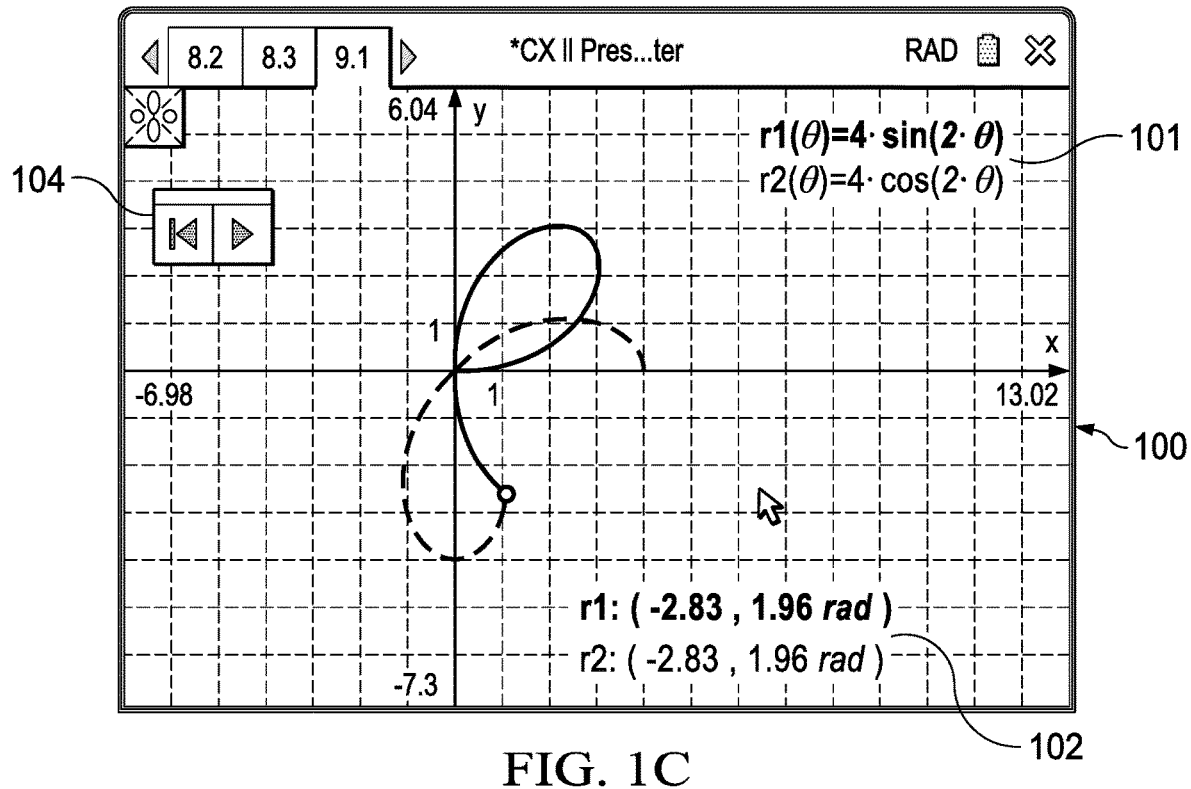
Figure 1D:
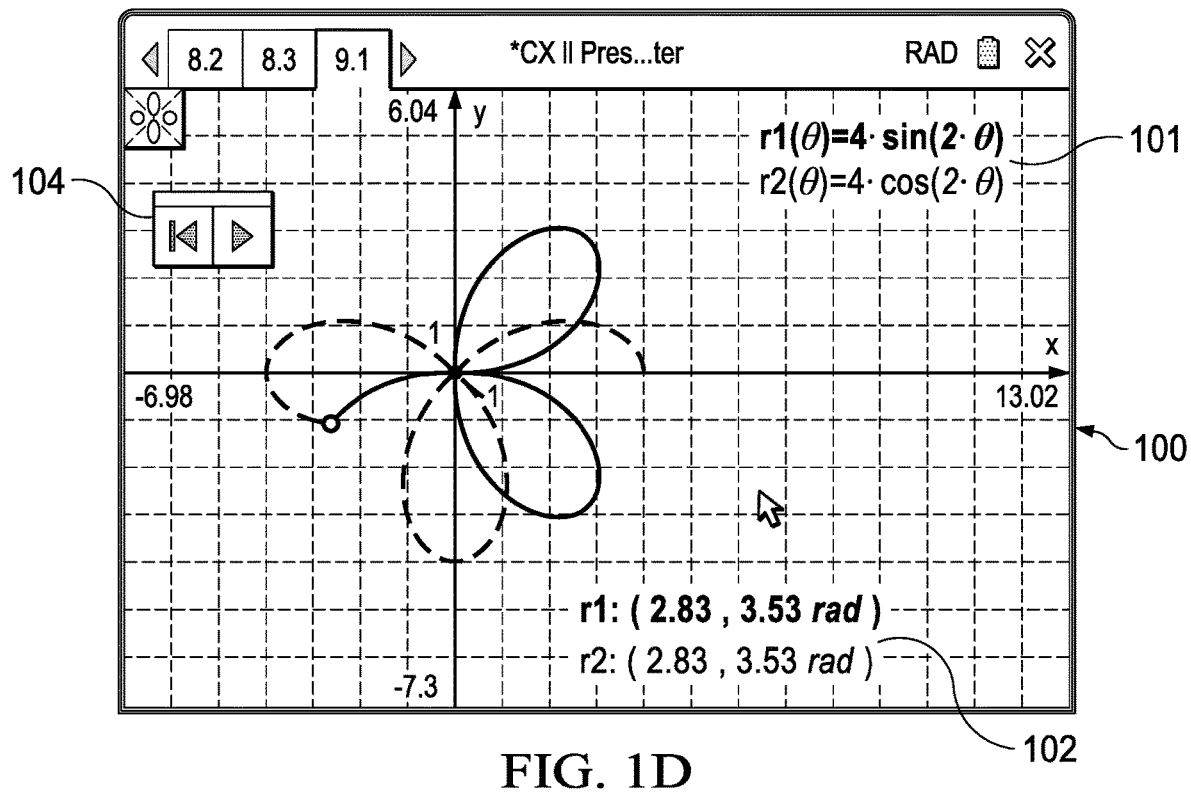
Figure 1E:
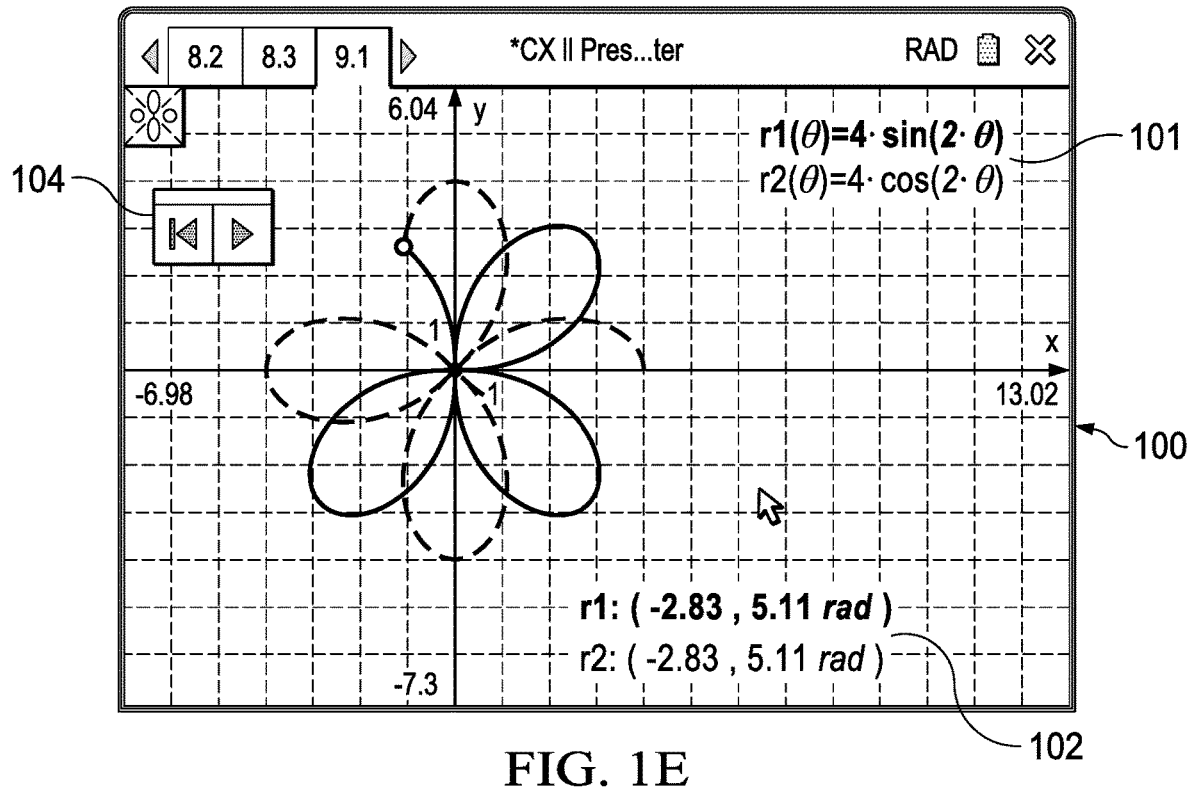
Figure 1F:
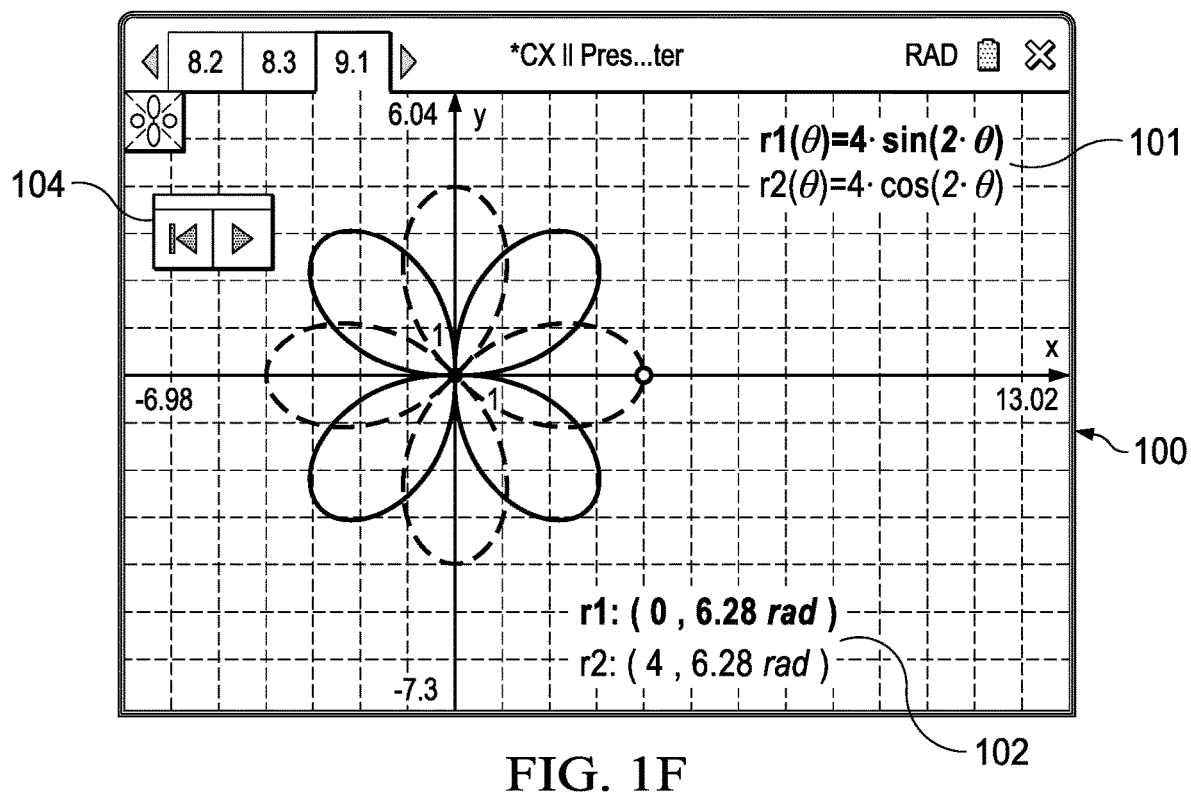

Specific embodiments of the disclosure will now be described in detail with reference to the accompanying figures. Like elements in the various figures are denoted by like reference numerals for consistency.

Graphing software used for mathematical instruction may immediately display plots of mathematical expressions in their entirety or may have some delay in rendering the plots that is imposed by limited computational capacity of the device executing the graphing software. However, there may be regions of interest in plots where it is desirable to slow down or reverse or halt a plot in process to explore what is happening. A user may also want to change independent variable values of a plot in process to observe the effects or jump from a current point in a plot to a future point to continue the plot.

Embodiments of the disclosure provide functionality for tracing of the paths of plots of mathematical expressions on digital devices such as, for example, handheld graphing calculators, tablets, laptops, and desktop computers, that may enable better understanding and visualization of mathematical concepts. In various embodiments, a user has more control over plotting of mathematical expressions than that provided in currently available graphing software. In some embodiments, a user can explore and analyze plots by viewing and controlling traces of the paths of the plots, including, for example, observing collision points if the plots are interpreted as trajectories. Further, in some embodiments, a user can select automatic tracing of a plot path in which the path of the plot is traced on the display point by point in its entirety unless the user halts the tracing.

In some embodiments, a user can manually step through a trace of a plot path according to a configurable step size that is used to change the values of an independent variable. In addition, in some embodiments, a user can optionally choose to have the future path of a plot displayed while the path of plot is being traced on the display. In some embodiments, if an expression is defined using undefined variables, a user can interactively modify the undefined variable values using a slider as a plot path is being traced and continue tracing the plot path. In some embodiments, a user can start and stop tracing a plot path and reverse the direction of tracing the plot path. Further, in some embodiments, a user can cause the tracing of a plot path to jump to a specified coordinate or coordinates by entering the value(s) of the coordinate(s). In some embodiments, a user can annotate points of interest in a plot path during the tracing of the path. Having such functionality to trace plot paths of mathematical expressions can improve understanding of the mathematical concepts.

Various examples of tracing of plot paths of mathematical expressions according to embodiments of the disclosure are presented herein. Due to limitations of technology available for patent applications, it is not possible to show the full tracing of plot paths in the figures. Accordingly, the examples are presented showing the state of the tracing of plot paths at a few selected coordinates even though in practice if the user does not select to stop the forward progression of the trace of a plot path, the trace of the plot path proceeds through sequential changes in coordinate values, i.e., through sequential points on the path, as independent variable values of the mathematical expression are changed according to a specified step size.

FIGS. 1A-1F are an example illustrating tracing of the paths of plots on a digital device in accordance with one or more embodiments. The display screen 100 for plotting includes a mathematical expression display area 101, a coordinates display area 102, and play/pause/reset controls 104. The mathematical expression display area 101 displays the expression or expressions to be plotted/traced. As will be seen in later examples, the mathematical expression display area 101 may be located in differing places on the display screen 100 or may be located in multiple places. In some embodiments, the location(s) of the mathematical expression display area 101 are determined automatically based on criteria such as number of expressions to be displayed, the length of the expressions, whether or not the display area 101 will overlap the plot, etc. In some such embodiments, the user can override the automatic location placements and specify the location of the display area 101.

The coordinates display area 102 displays values of the plot coordinates of the mathematical expression or expressions being plotted/traced. Initially, the coordinates display area 102 displays plot coordinates at which the plotting/tracing will start. The plot coordinates are then updated as the plotting/tracing of the mathematical expression or expressions progresses. If the plotting/tracing is halted, the coordinates display area 102 displays plot coordinates for each mathematical expression being plotted/traced at the point in time when the plotting/tracing was halted.

The play/pause/reset controls 104 are used to start, pause, or reset the plotting/tracing of the mathematical expression(s) shown in the mathematical expression display area 101. The right control is used to start or stop the plotting/tracing and the left control is used to reset the plotting/tracing to the beginning. When the plotting/tracing is started, e.g., by selecting the right control of the controls 104, the plot path(s) of the expressions(s) is/are traced on the display screen 100 point by point as the independent variable value changes through a predetermined domain. The domain of the independent variable values for the plotting/tracing can be defined, for example, by setting the domain when the mathematical expression(s) are entered. A step size to be used to increment (or decrement) the independent variable value can also be specified when the mathematical expression(s) are entered. As is described in more detail herein, the step size for changing the independent variable value during the plotting/tracing can be changed by the user when modifying path plot settings.

The example of FIGS. 1A-1F illustrates tracing of the plot paths of two polar equations. A polar equation is an equation defining an algebraic curve expressed in polar coordinates. For example, a polar equation can be specified by defining r as a function of $\theta$, where $\theta$ is an independent variable. Angles in polar notation are generally expressed in either degrees or radians where $2\pi$ rad is equal to 360°.

The two polar equations being plotted/traced are displayed in the mathematical expression display area 101 of FIGS. 1A-1F. As shown in FIG. 1A, the coordinates display area 102 displays the initial values of plot coordinates for each polar equation. In each of FIGS. 1B-1F, the coordinates display area 102 displays the plot coordinates for each equation at a point in time the plotting/tracing was paused.

For this example, each of FIGS. 1B-1F illustrates a point at which the two plots collide, i.e., where the coordinates for each plot are the same.

FIGS. 2A-2E are an example illustrating tracing of the paths of plots on a digital device in accordance with one or more embodiments. In particular, the example of FIGS. 2A-2E illustrates tracing of the plot paths of parametric equations. Parametric equations are a set of equations that express a set of quantities as explicit functions of one or more independent variables referred to as parameters. Parametric equations are commonly used to express the coordinates of the points that make up a geometric object such as a curve or surface, in which case the equations are collectively called a parametric representation or parameterization. Parametric equations are also commonly used to represent the trajectory of an object or objects in which time is the parameter (independent variable) linking the equations.

Figure 2A:
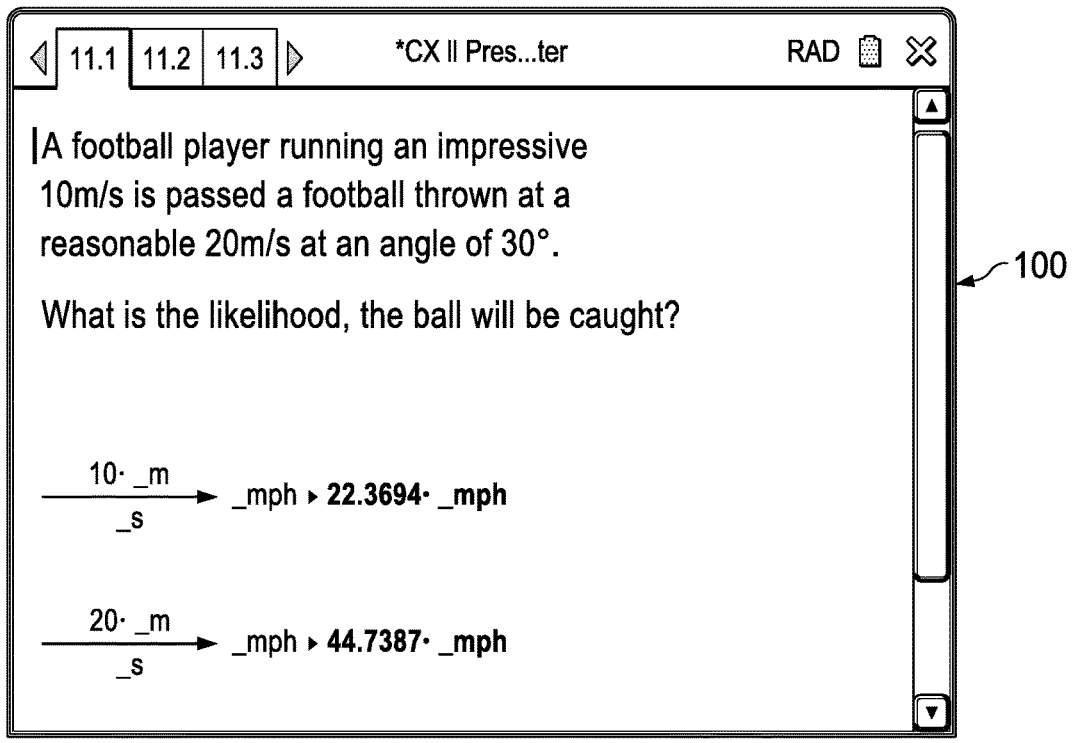
FIGS. 2A-2E are an example illustrating tracing of paths of parametric plots on a digital device.
Figure 2B:
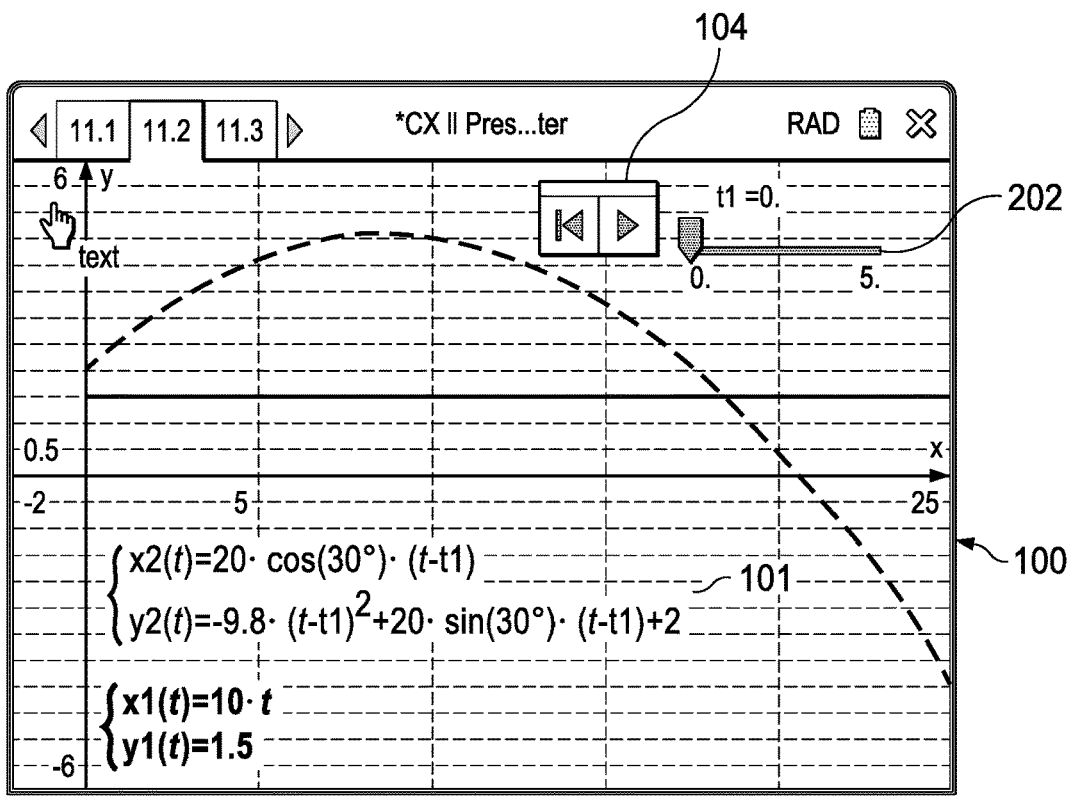

In FIG. 2A, a problem to be solved using parametric equations is presented on the display screen 100. In essence, the user is tasked with determining if a football player running at a defined speed will catch a ball thrown at a defined angle and a defined speed. The parametric equations shown in the mathematical expression display area 101 of FIG. 2B and subsequent figures model the speed and angle of the ball and the speed of the football player. In these equations, the variable t1 represents the elapsed time between when the football player begins running and when the ball is thrown. The value of t1 is undefined and the goal is to find a value of t1 where the ball and the player will arrive at the same coordinates.

For this problem, the display screen 100 includes a slider 202 (FIGS. 2B-2F) associated with the undefined variable t1. In some embodiments, a slider is created automatically when the mathematical expression(s) to be plotted refers to an undefined variable. A slider can be used to change the value of the associated undefined variable within a defined domain while the plot paths are being traced to observe the effect of the change on the plots. The slider can also be used to change the value before tracing is initiated or when the tracing of the plot paths is paused.

Figure 2C:
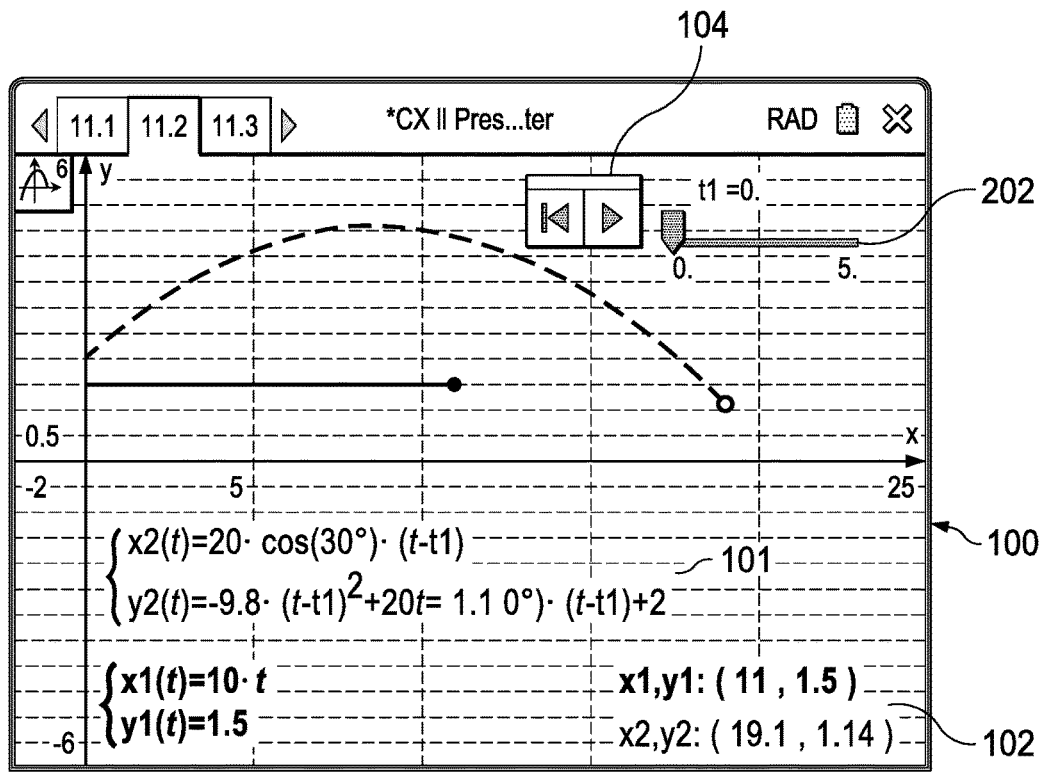
Figure 2D:
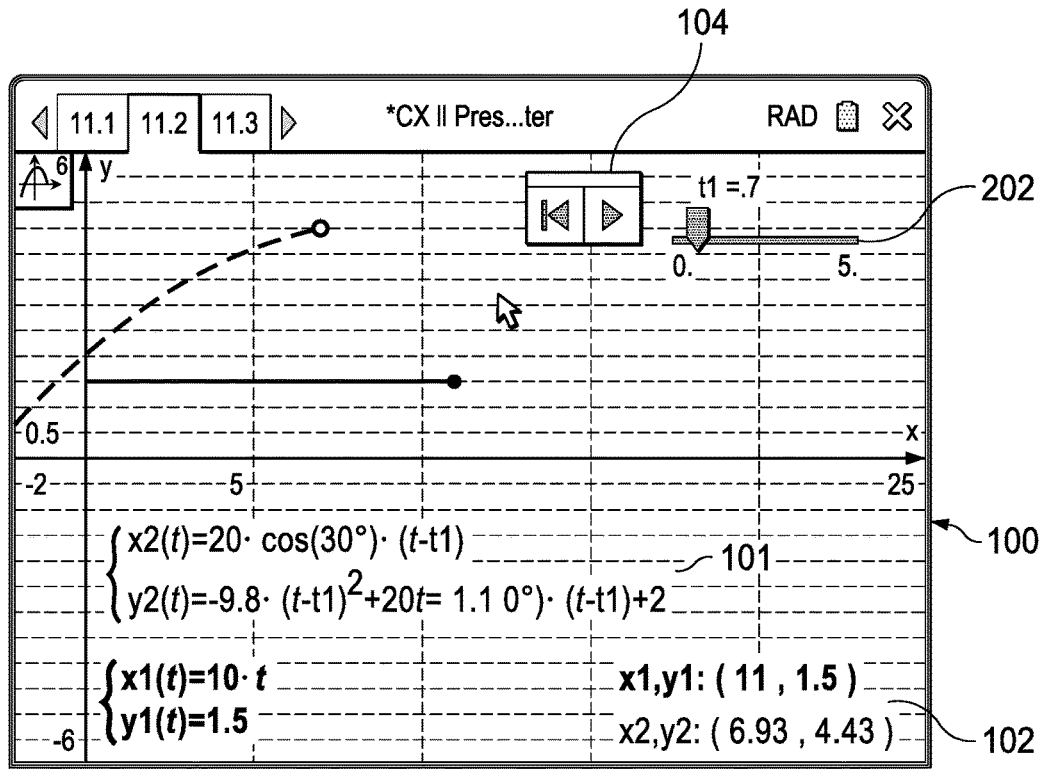
Figure 2E:
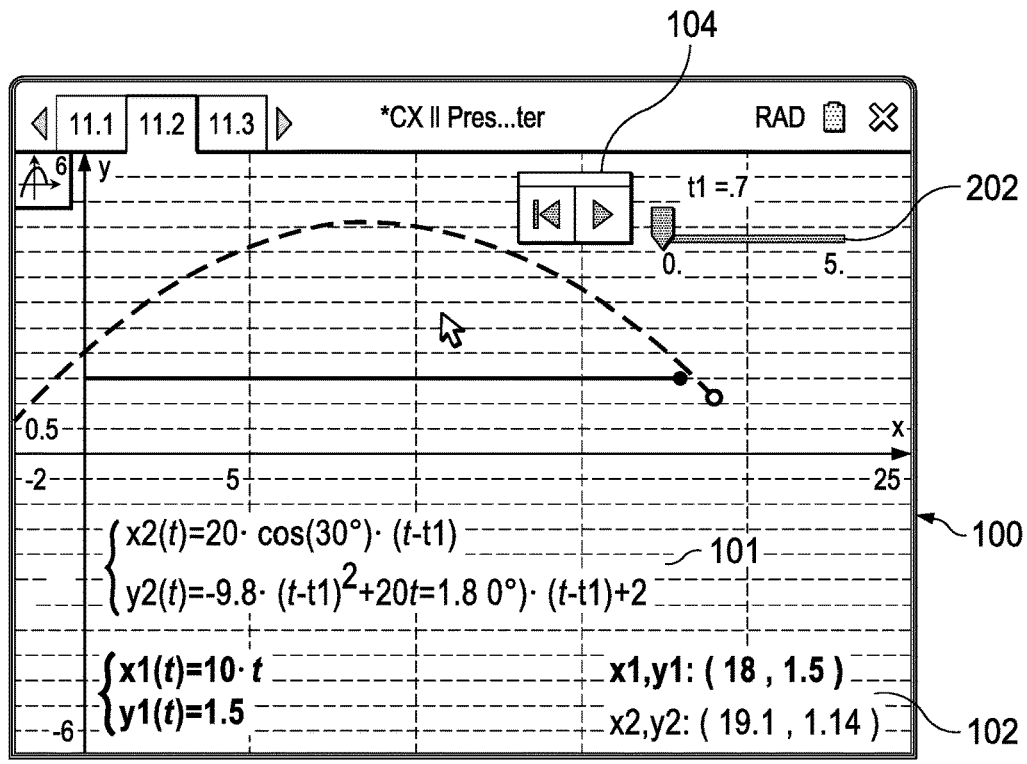

FIG. 2C illustrates the state of tracing of the plot paths of the parametric equations when the plotting/tracing is initiated with t1=0. While the plot paths are being actively traced, the user can observe that t1=0 will not have the desired result. As illustrated in FIG. 2D, the user uses the slider 202 to change the value of t1 to be 0.7. The plot path of the equation modeling the speed and angle of the ball is automatically reversed to reflect this change and the tracing of the plot paths continues with the new value of t1. As illustrated in FIG. 2E, while the plot paths are being traced with the new value of t1, the user can observe that t1=0.7 is closer to the value needed although not yet the correct value.

Figure 3A:
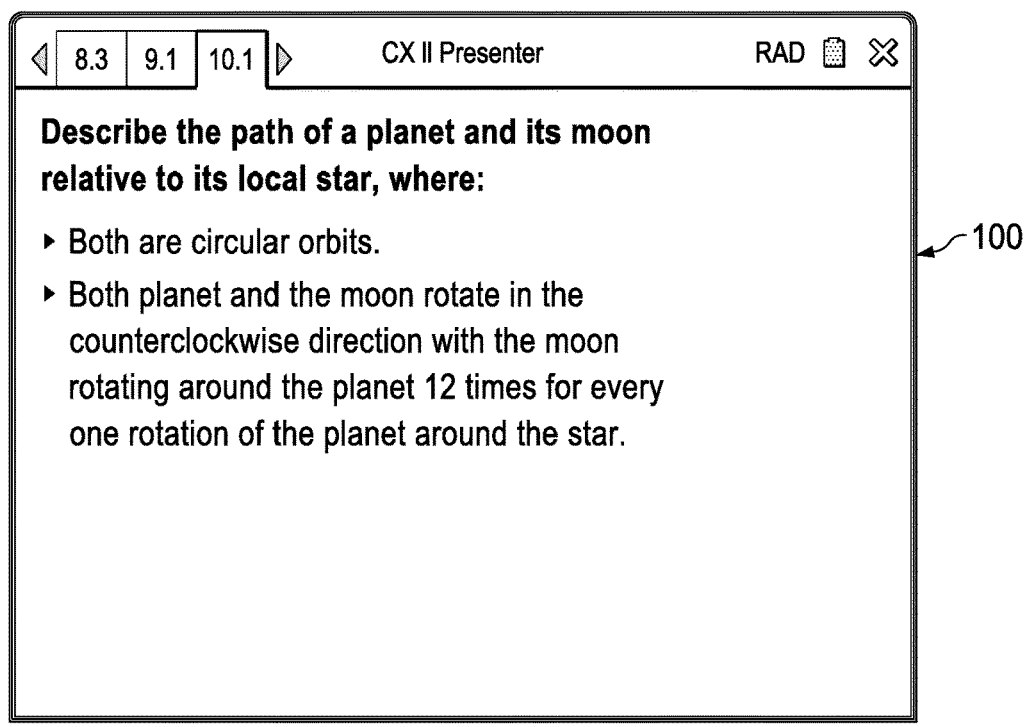
FIG. 3A-3F are an example illustrating tracing of paths of parametric plots on a digital device.
Figure 3B:
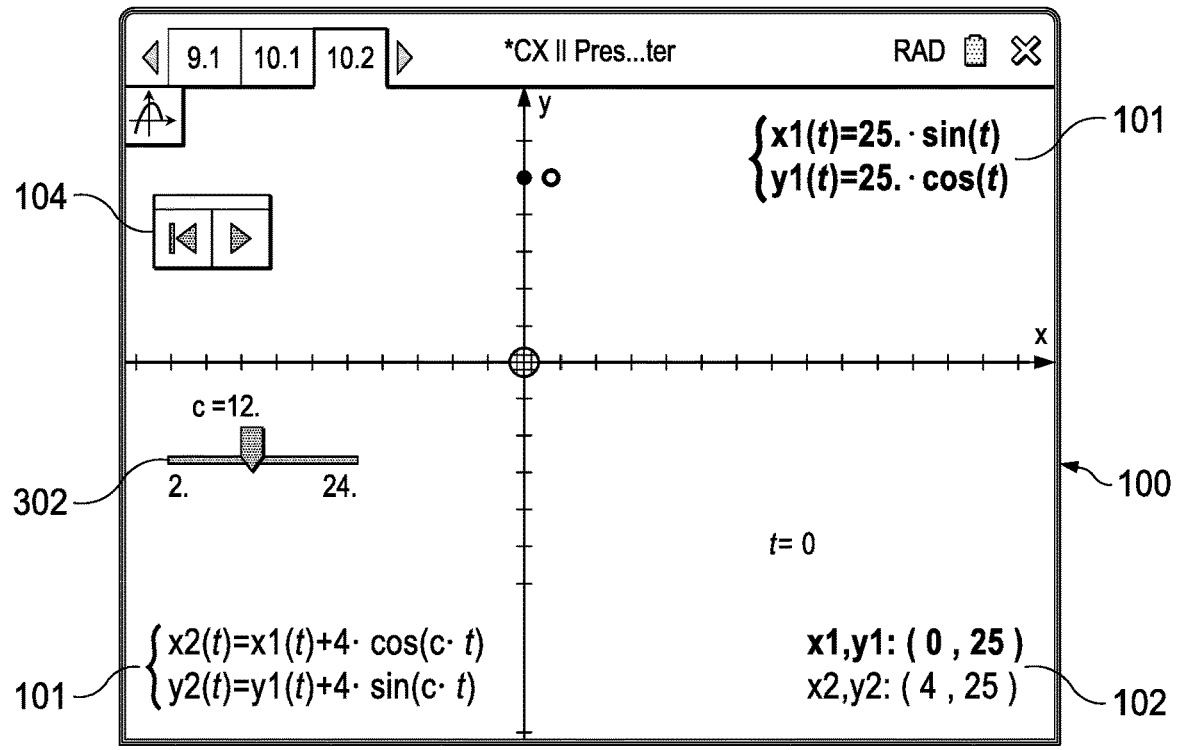
Figure 3C:
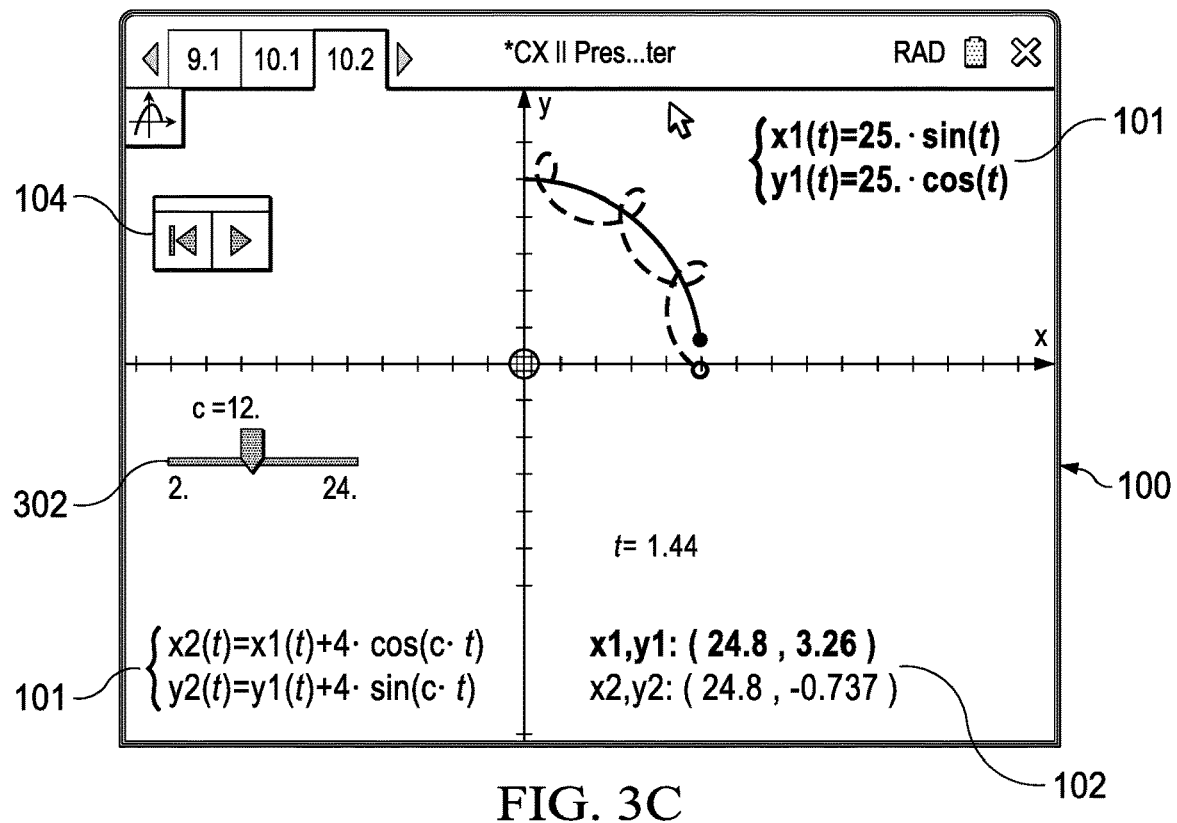
Figure 3D:
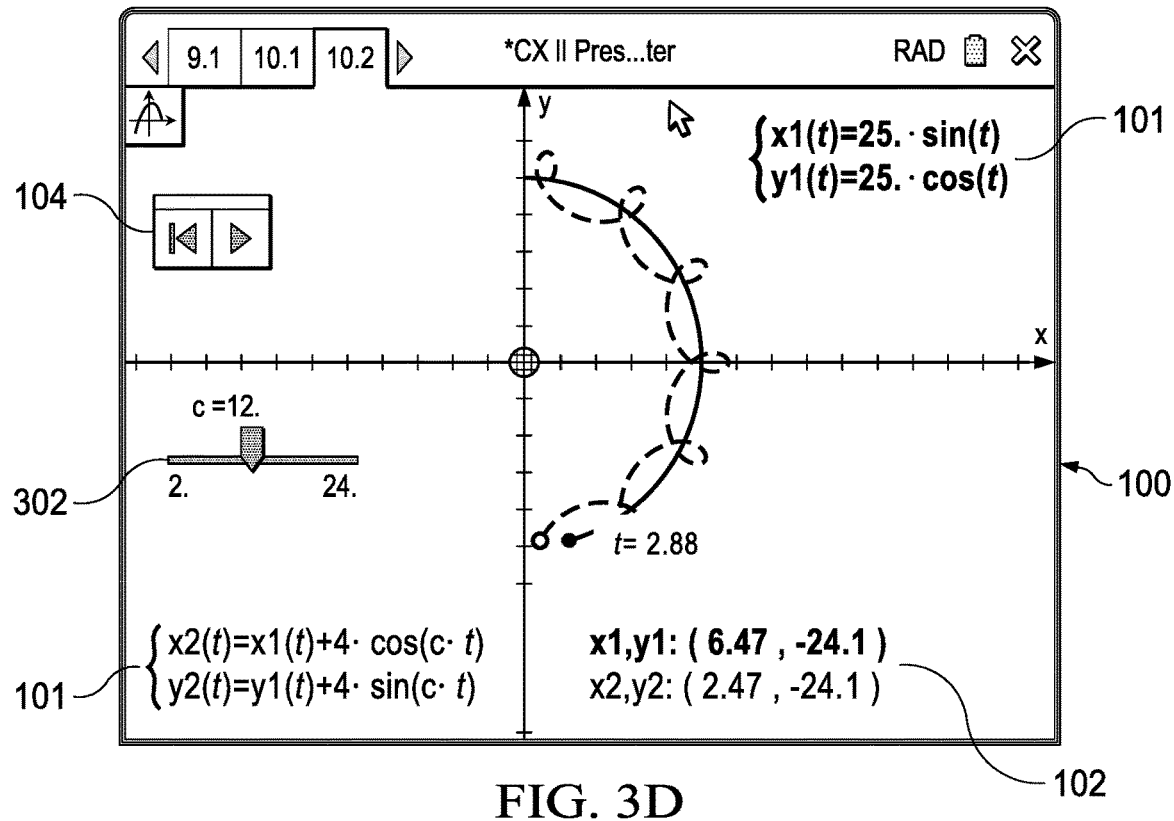
Figure 3E:
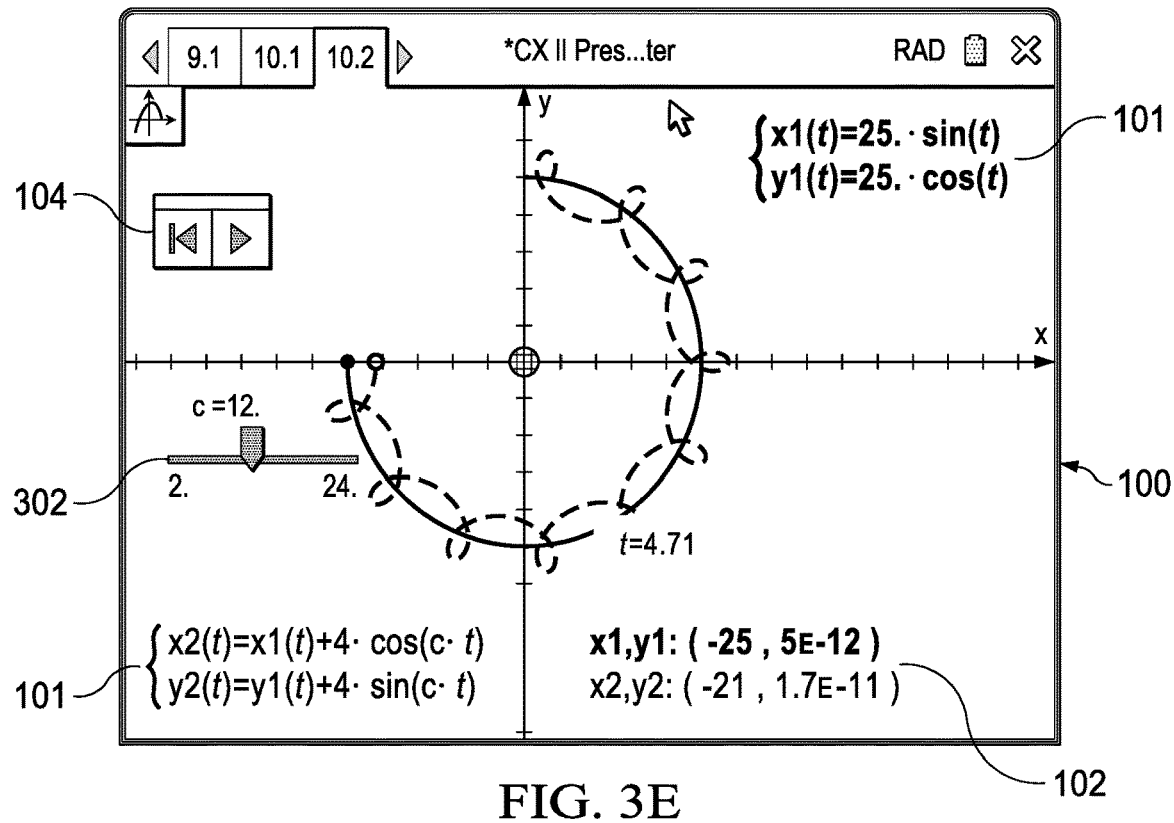
Figure 3F:
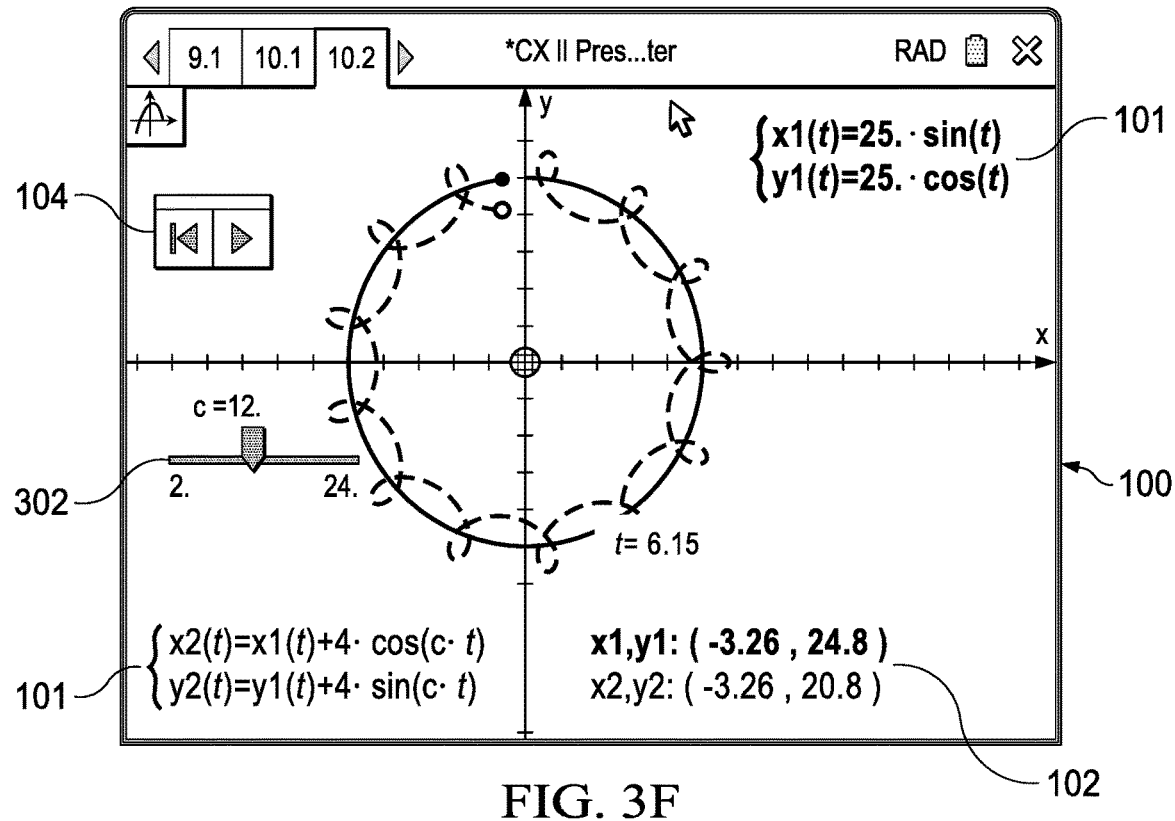

FIG. 3A-3F are an example illustrating tracing of the paths of plots on a digital device in accordance with one or more embodiments. In particular, the example of FIGS. 3A-3F illustrates tracing of the plot paths of parametric equations. In FIG. 3A, a problem to be solved using parametric equations is presented on the display screen 100. In essence, the user is tasked with plotting the path of a planet and its moon as the planet rotates around a star and the moon rotates around the planet. The parametric equations shown in the split mathematical expression display area 101 of FIG. 3B and subsequent figures describe the path of the planet and its moon relative to the star. The display screen 100 includes a slider 302 (FIGS. 3B-3F) associated with the undefined variable c. The undefined variable c specifies the number of times the moon orbits the planet. FIGS. 3C-3F show snapshots of the tracing the plot path when c=12.

Figure 4A:
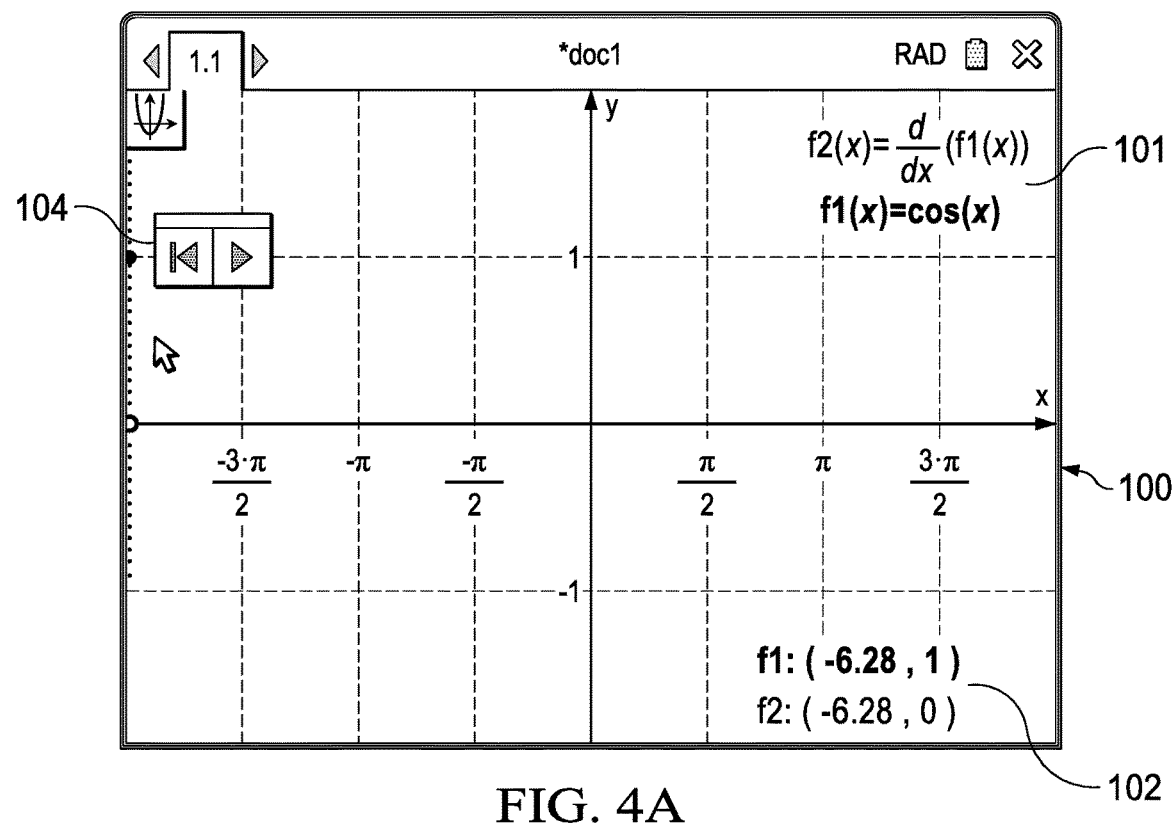
FIGS. 4A-4D are an example illustrating tracing of paths of function plots on a digital device.
Figure 4B:
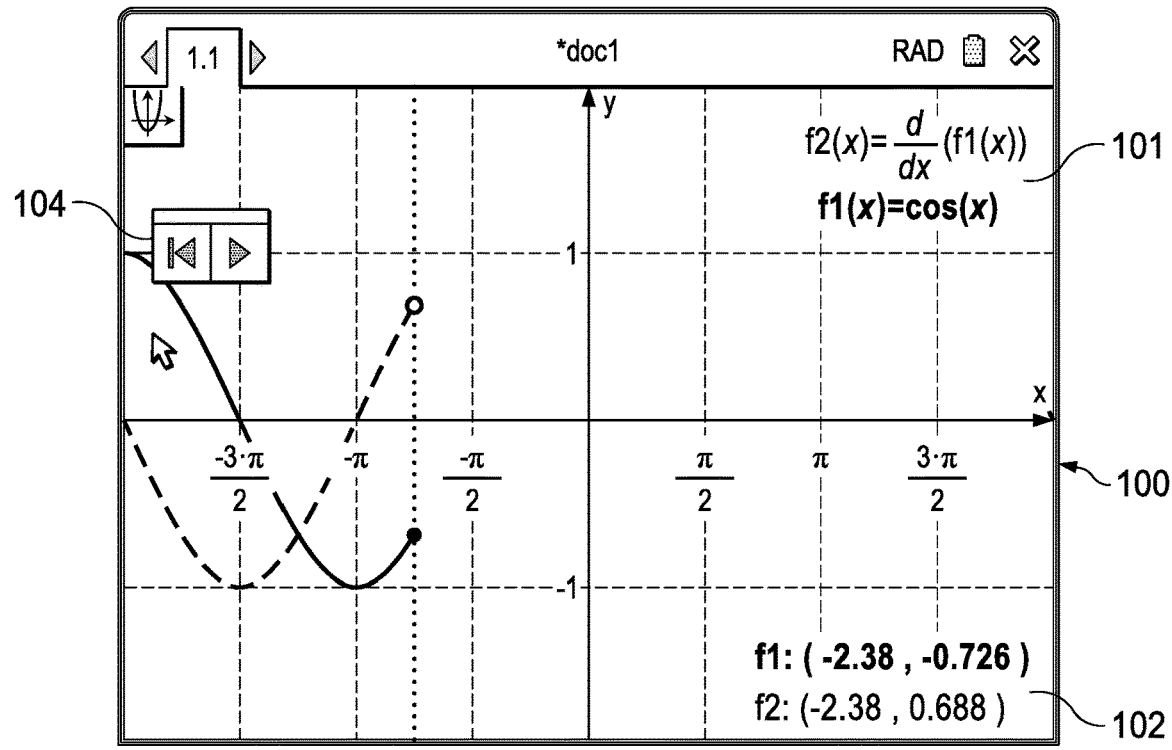
Figure 4C:
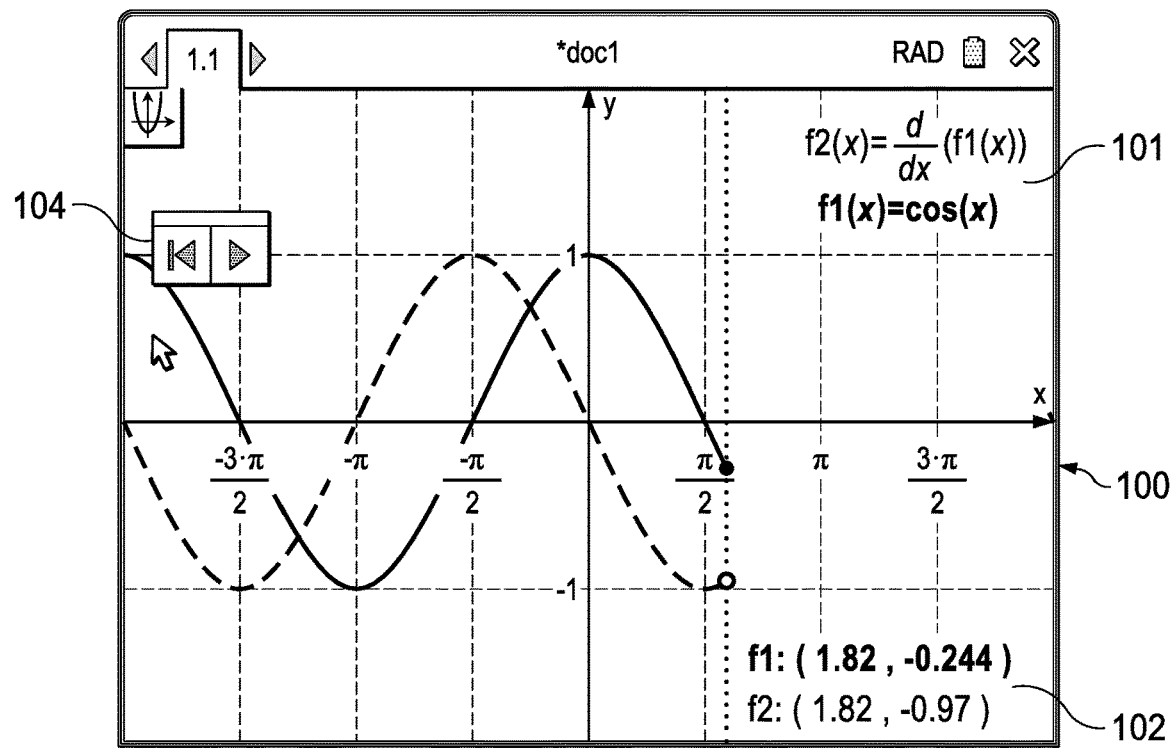
Figure 4D:
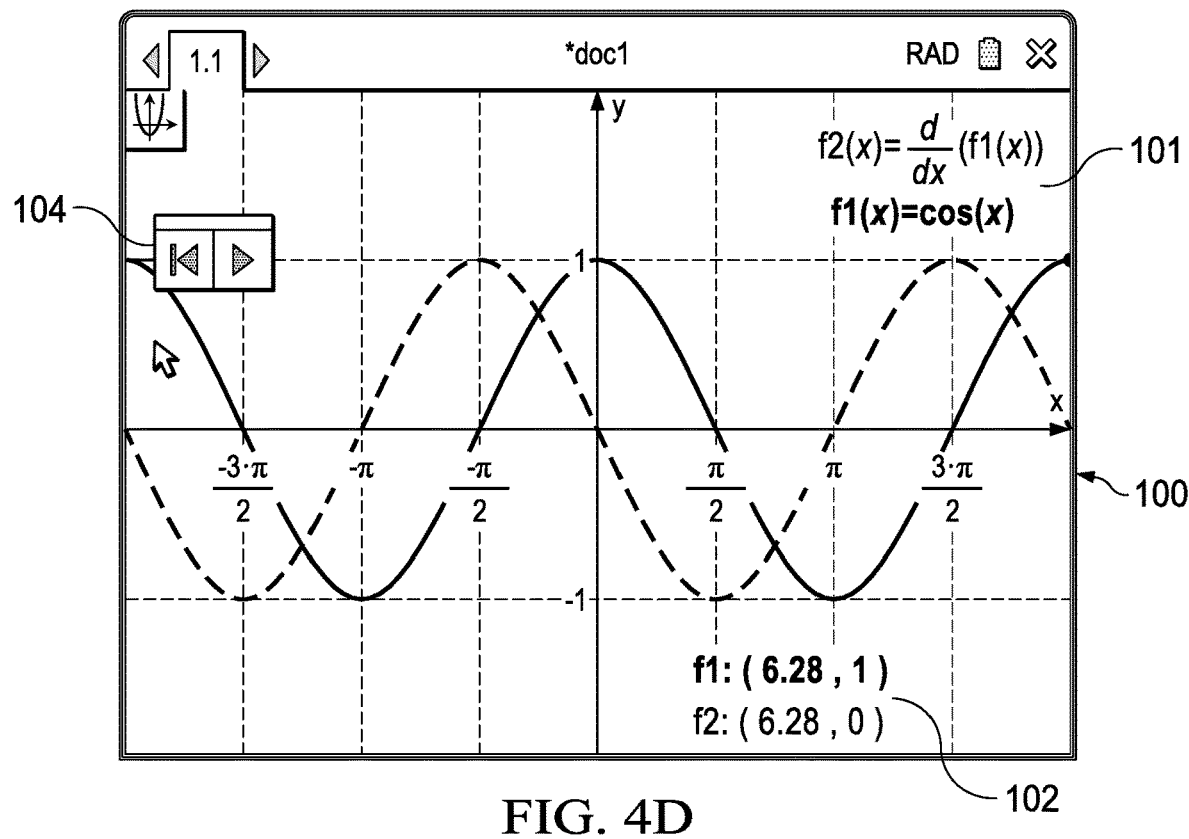

FIGS. 4A-4D are an example illustrating tracing of the paths of plots on a digital device in accordance with one or more embodiments. In particular, the example of FIGS. 4A-4D illustrates tracing of the plot paths of functions. A function is a process or a relation that associates each element x of a set X, the domain of the function, to a single element y of a set Y (which may be the set X), the codomain of the function. A function is often written as "f(x)" where x is the input value. The functions to be plotted are shown in the mathematical expression display area 101 and FIGS. 4B-4D show snapshots of the plot traces across the domain of x.

Figure 5A:
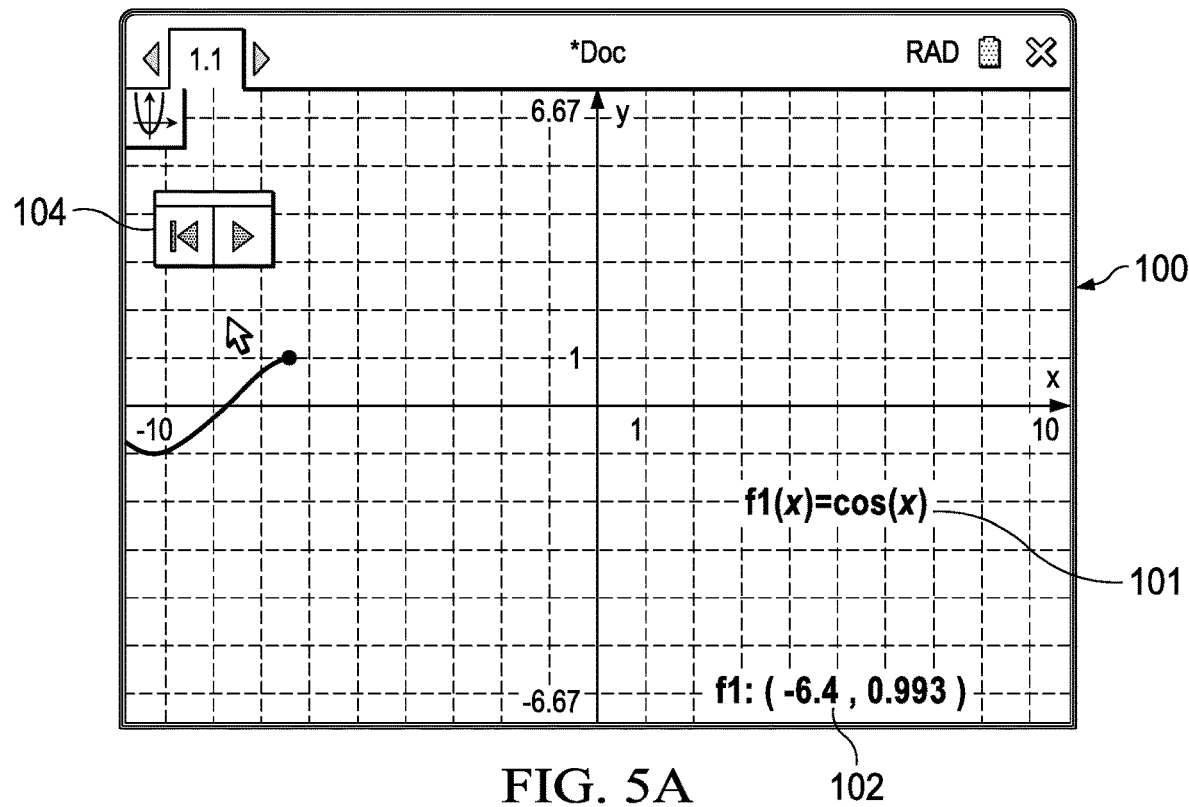
FIGS. 5A-5C are example of jumping the tracing of a path of a plot to a specified point.
Figure 5B:
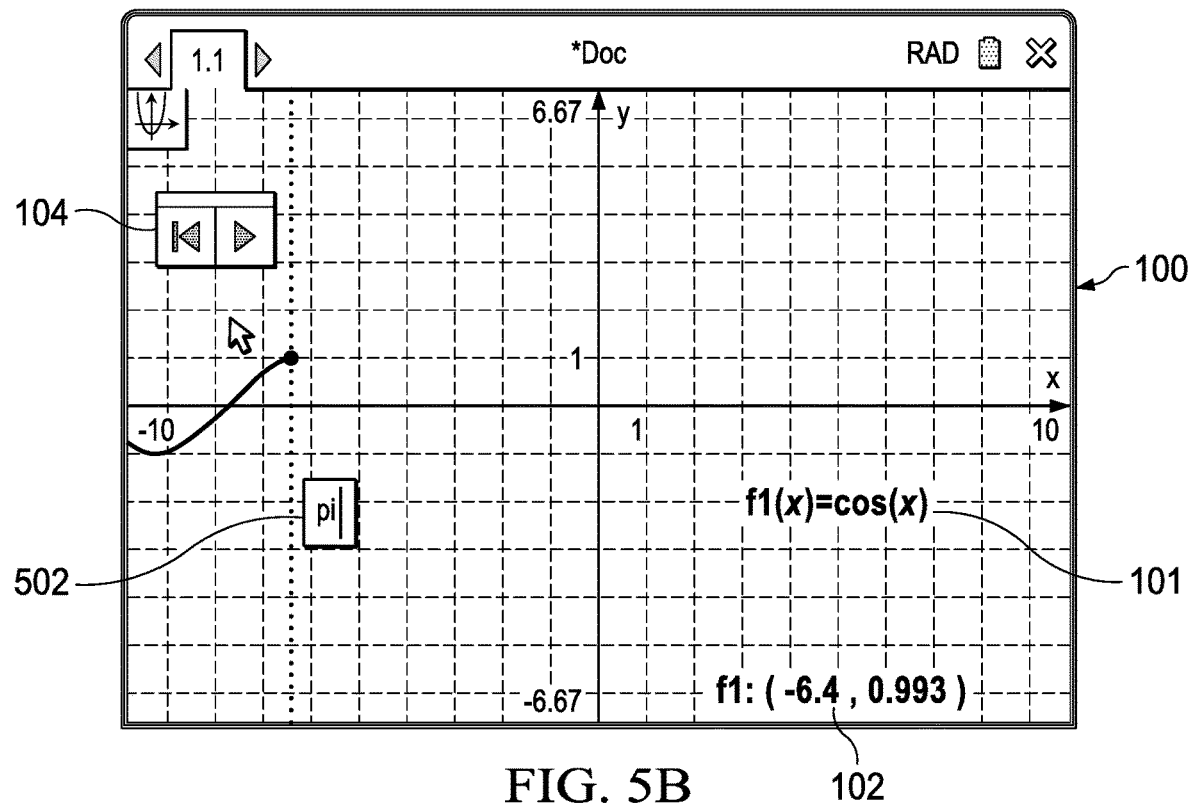
Figure 5C:
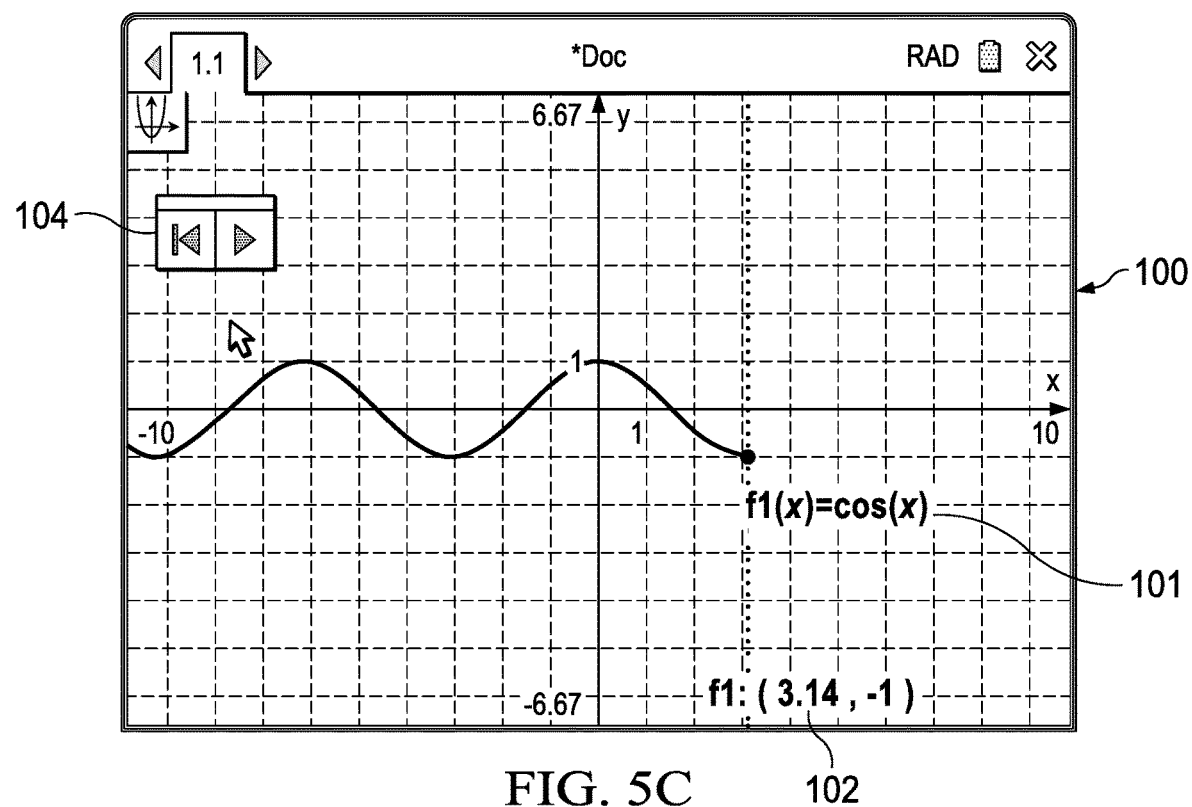

In some embodiments, a user can jump the tracing of a plot path to a particular point (either forward or backward) while the plot path is being traced by typing the value(s) of coordinate(s) appropriate to the mathematical expression(s) being plotted. FIGS. 5A-5C are example of jumping the tracing of a plot path of a function to the coordinate π. The function being plotted/traced is shown in the mathematical expression display area 101. FIG. 5A shows the state of the plot path tracing of the function when the user decides to jump the plot path to another point. FIG. 5B shows that the user types in the value "pi" 502 to indicate that the tracing of the plot path is to be jumped immediately to that coordinate. Note that the use of "pi" is a special case in which the entry is transformed internally to the floating point value. FIG. 5C shows the plot path trace after it is jumped to coordinate π.

Figure 6:
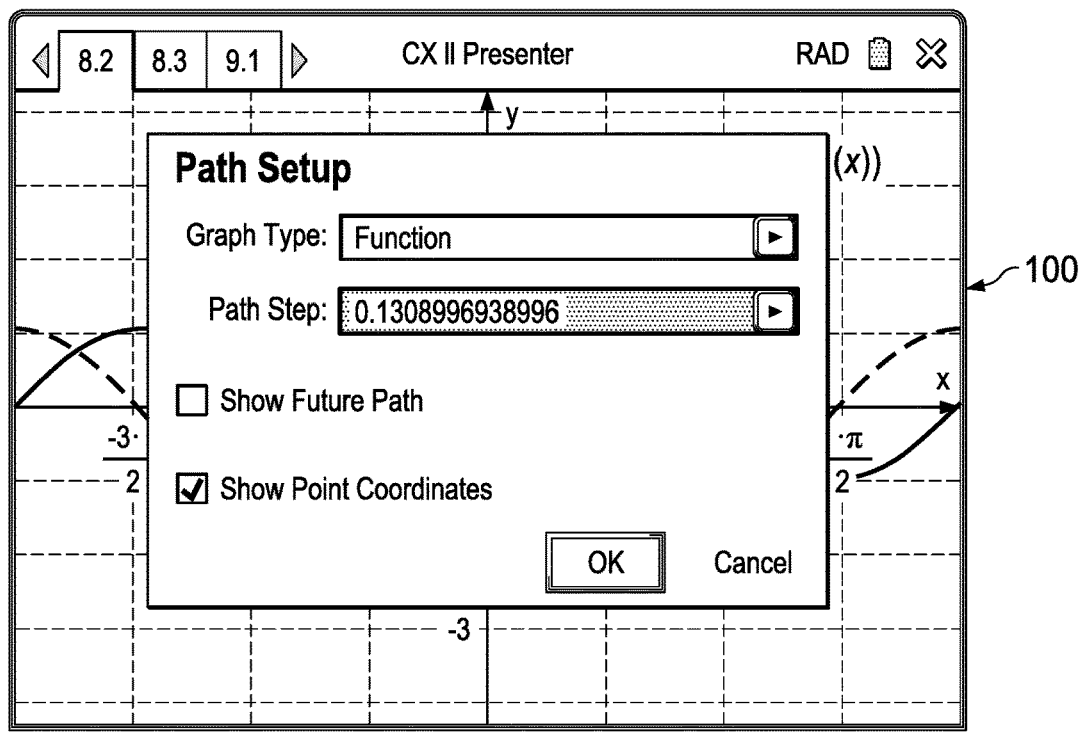
FIG. 6 shows an example menu for changing path plot settings.

As illustrated by the example menu shown in FIG. 6, in some embodiments, a user can change one or more settings related to the tracing of the plot path of one or more mathematical expressions. For example, a user can designate the type of graph to be plotted/traced and the step size to be used in changing the independent variable values as a plot path is being traced. Further, the user can choose whether or not point coordinates are to be shown for annotated points, and whether or not the future path of a plot path is to be shown as a plot path is traced. A future path shows the final result of the plot path while the plot path is being traced.

A user can choose to annotate points of interest in a plot path at any point in time a plot path is being traced on the display screen 100 by, for example, pressing the enter key on the keyboard of the digital device in use. If a point is annotated, a dot (or other clearly visible symbol) is placed on the display screen 100 at the coordinate(s) of the plot at the time the enter key was pressed and the coordinate(s) of the point are also displayed on the display screen 100 near the dot unless the user has opted to not show the coordinate(s).

Figure 7A:
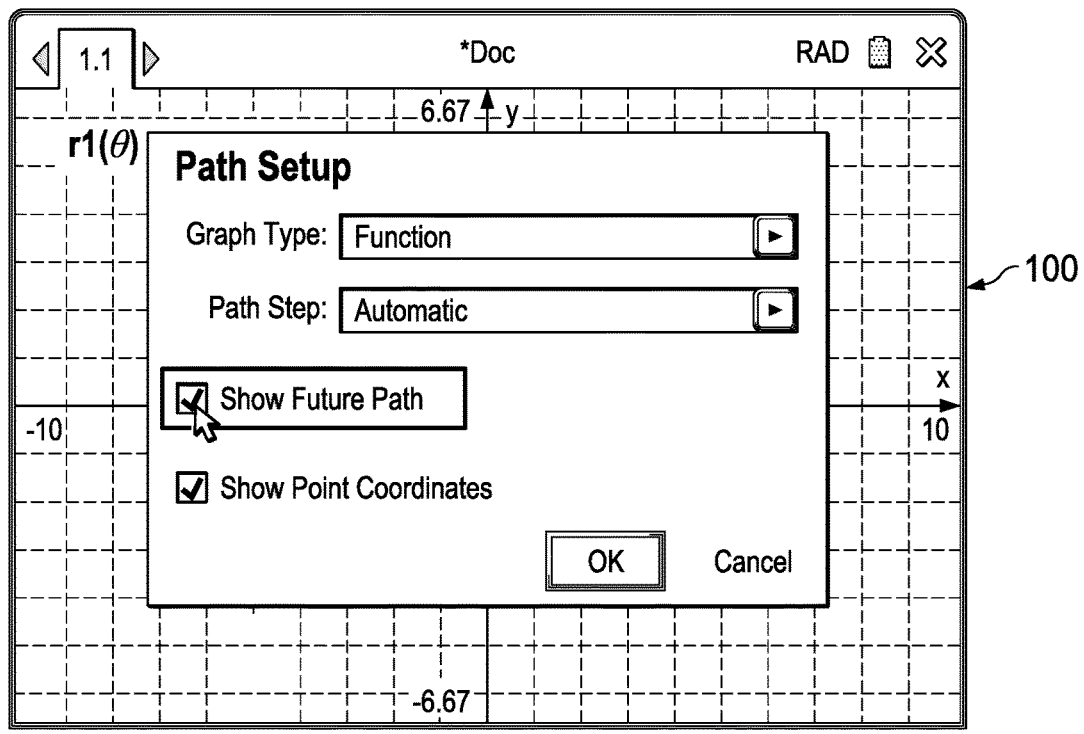
FIGS. 7A-7E are an example illustrating the use of the future path setting and point annotation.
Figure 7B:
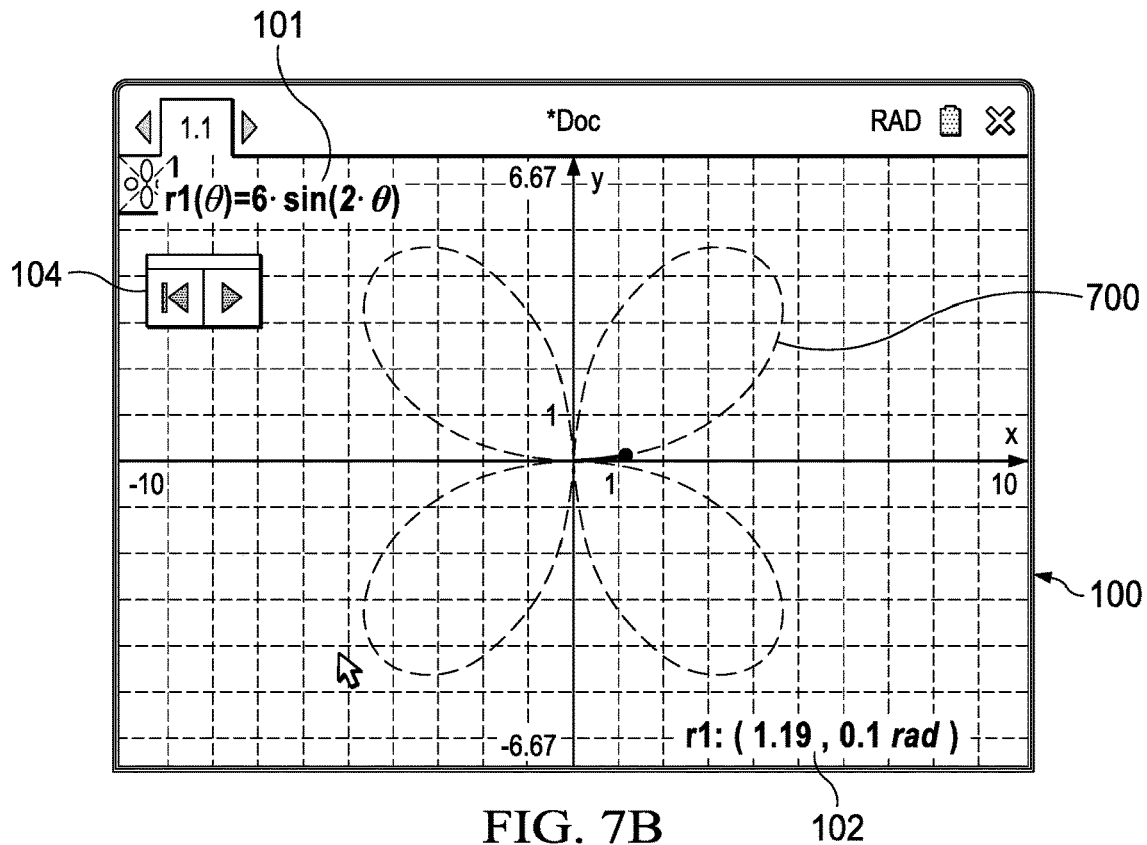
Figure 7C:
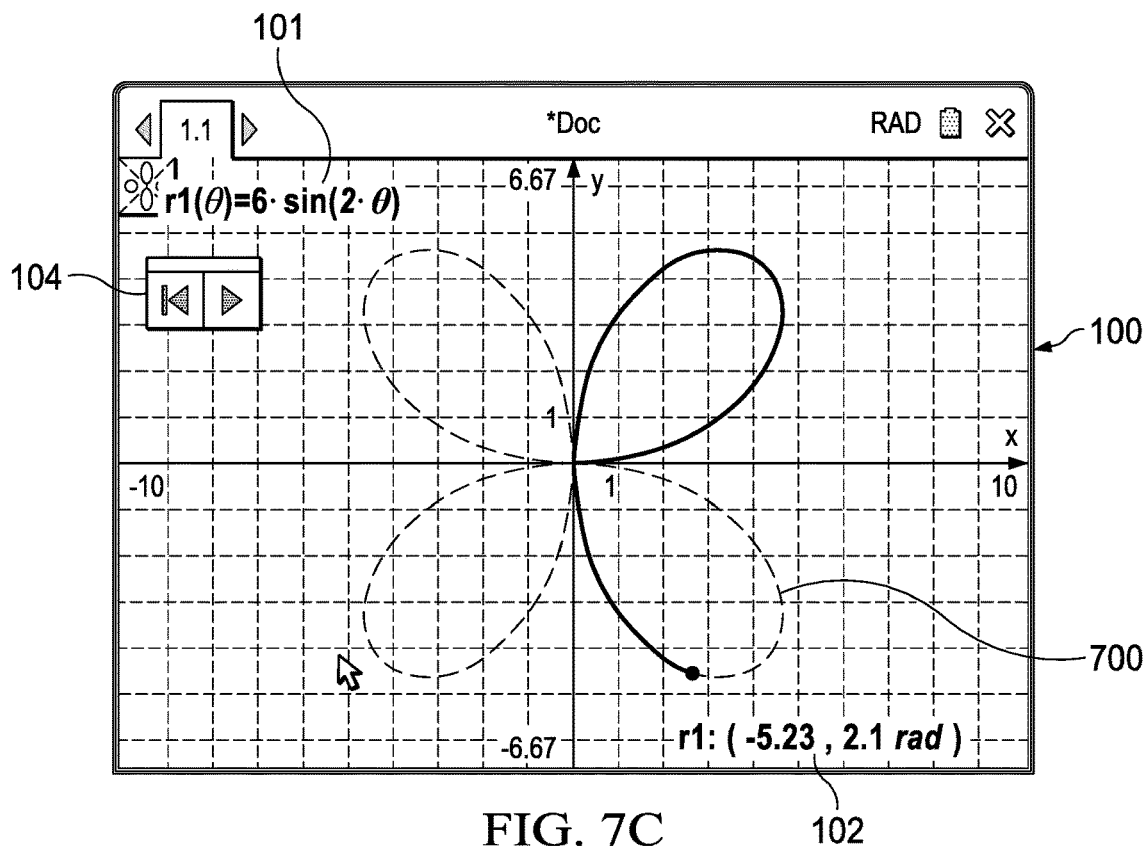
Figure 7D:
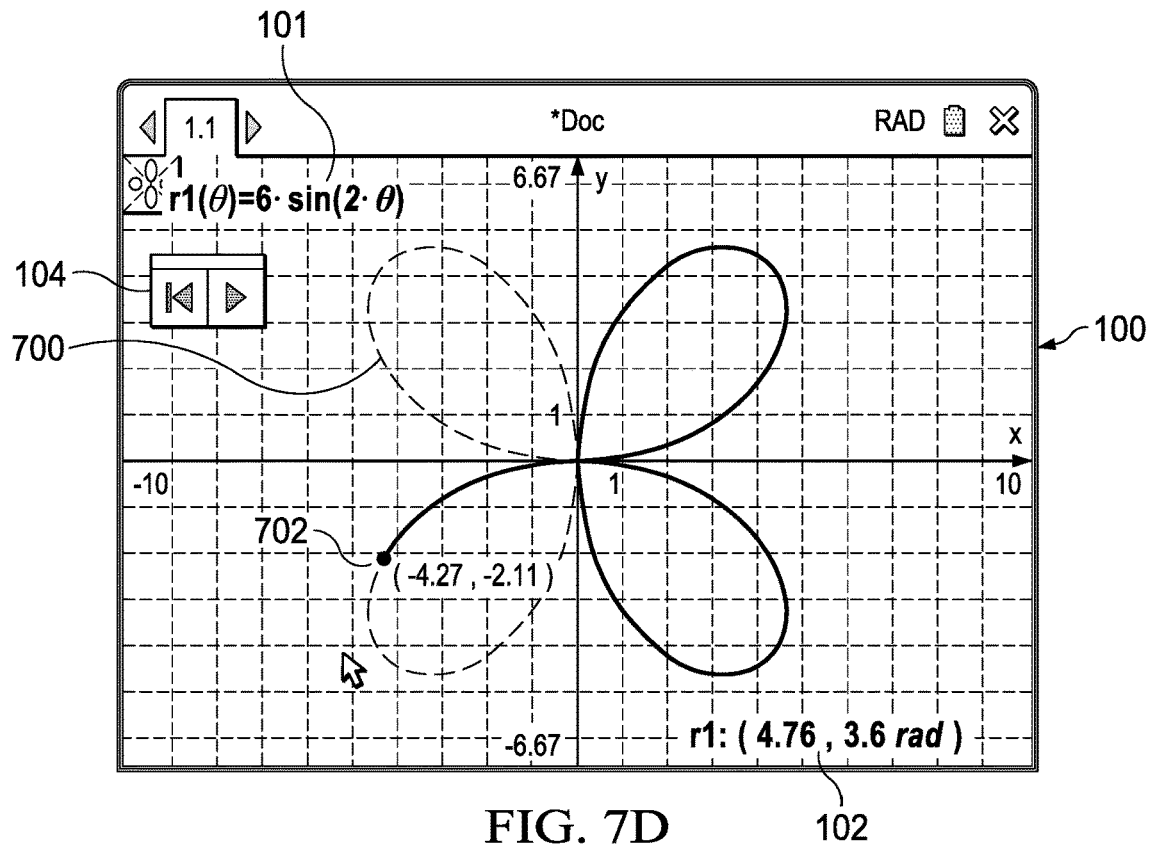
Figure 7E:
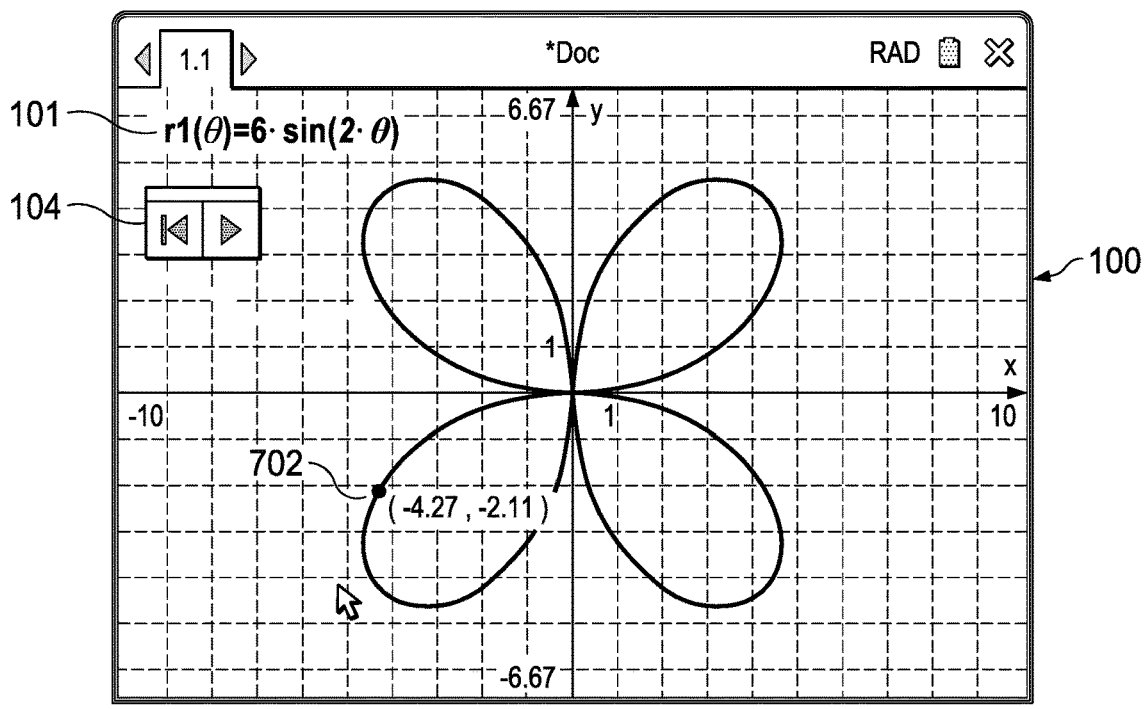

FIGS. 7A-7E are an example illustrating the use of the future path setting and point annotation in accordance with one or more embodiments. In FIG. 7A, the user uses the menu of FIG. 6 to indicate that a function is to be plotted/traced, the future path of the function plot path is to be shown while the plot path is traced on the display screen 100, and point coordinates are to be displayed if points are annotated. FIG. 7B shows the future path 700 of the function in the mathematical expression display area 101 prior to initiation of the plot path tracing. FIG. 7C shows a snapshot of the display screen 100 as the plot path is traced. Note that the future path 700 is displayed in a fashion that contrasts it with the tracing of the plot path. FIG. 7D shows a snapshot of the display screen 100 after the user opts to annotate a point 702 while the plot path is traced. The coordinates of the point 702 are displayed as per the trace setting selected by the user. FIG. 7E shows the completion of the plot path trace.

Figure 8:
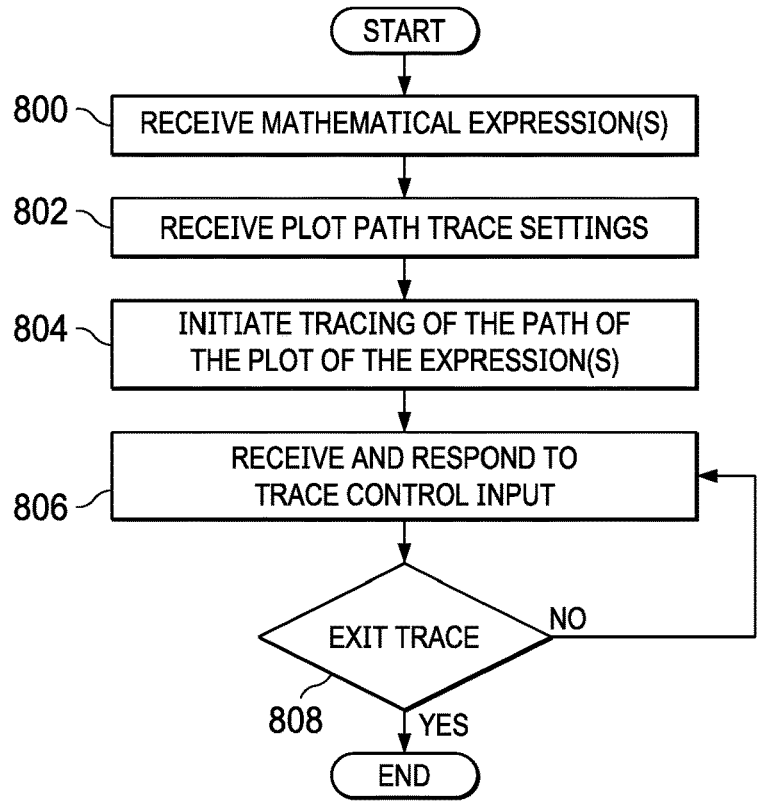
FIG. 8 is a flow diagram of a method for path tracing of mathematical plots on a digital device.

FIG. 8 is a flow diagram of a method for path tracing of mathematical plots on a digital device in accordance with one or more embodiments. The method is explained with reference to the above examples. Initially, one or more mathematical expressions to be plotted/traced are received 800 in the digital device. For example, a user can enter the expression or expressions using a keyboard of the digital device. In another example, the expression or expressions can be taken from other calculations in progress on the digital device. In another example, the expression(s) can be accessed from a file stored on the digital device.

Plot path trace settings for the mathematical expression(s) are also received 802. For example, a user can indicate the graph type, e.g., function, parametric, or polar, the step size, etc., using the menu of FIG. 6. The user then initiates 804 tracing of the plot path of the mathematic expression(s) using the play/pause/reset controls 104.

As the tracing of the plot path is displayed on the display screen 100, i.e., as the plot is displayed point by point, trace control input, if entered by the user, is received and responses are generated 806. For example, the user can use the play/pause/reset controls 104 to pause and resume the tracing or to reset the tracing to the beginning and restart. In another example, as per the example of FIGS. 5A-5C, the user can enter the coordinate(s) of a point using the keyboard of the digital device which causes the plotting/tracing to jump to the specified point. In another example, the user can press the enter key on the keyboard to cause a point on the plot path at the time the enter key is pressed to be annotated. In another example, the user can choose to step through the trace of the plot path using arrow keys on the keyboard of the digital device, e.g., pressing the right arrow key causes the trace of the plot path to move forward by the specified step size and pressing the left arrow key causes the trace of the plot path to move backward by the specified step size. In another example, the user can use a slider (if displayed) to change the value of an undefined variable which causes the update of plotting/tracing values. The receipt and response to trace control input continues until the user chooses to exit 808 the trace, e.g., by pressing the escape key on the keyboard.

Figure 10:
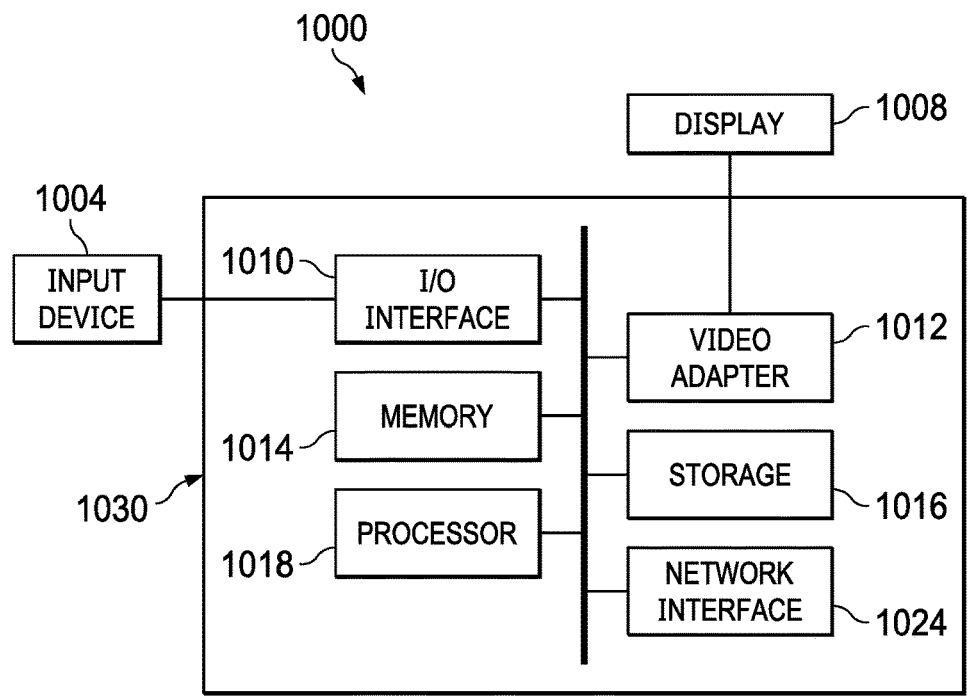
FIGS. 9 and 10 are block diagrams of two example digital devices.
Figure 9:
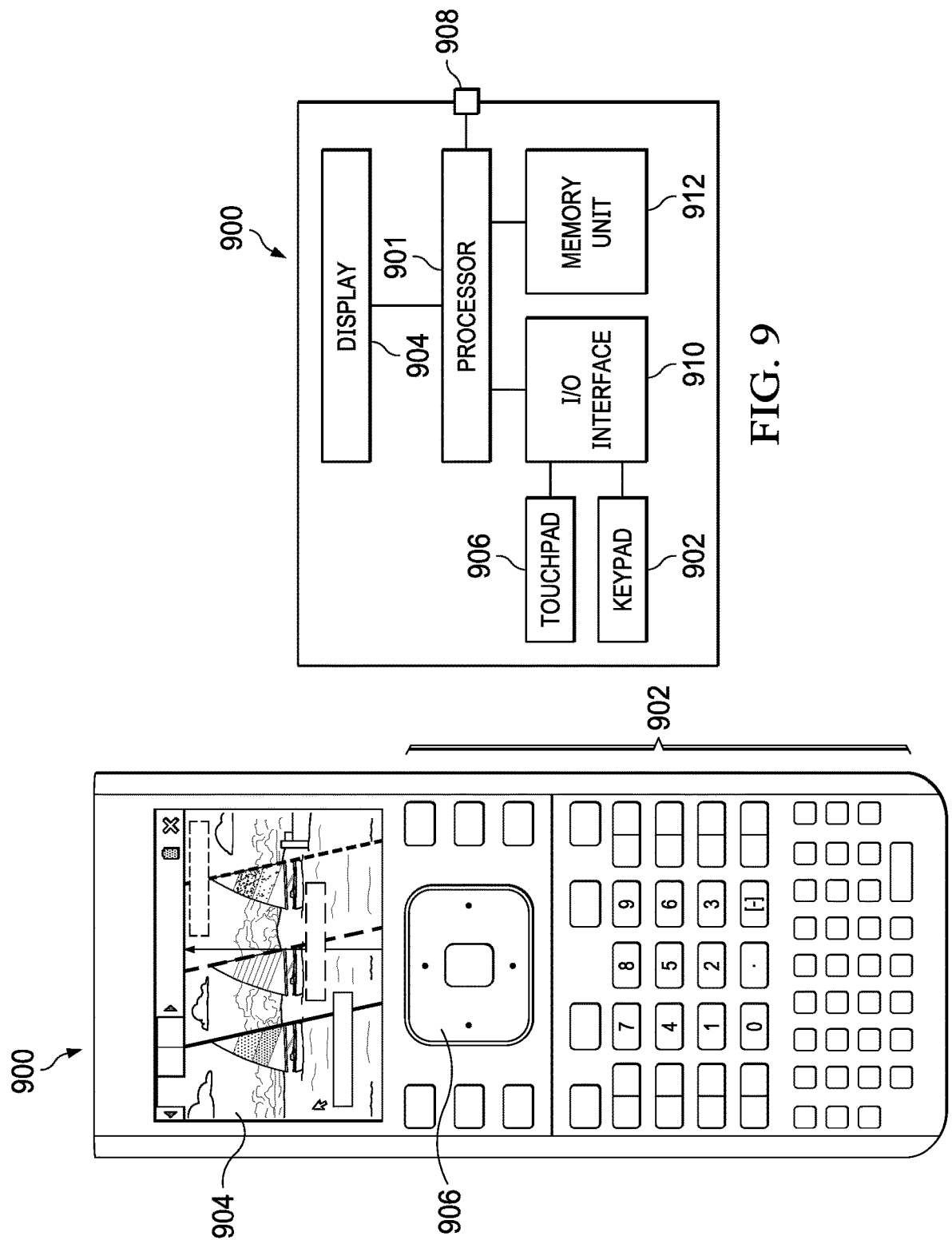

Embodiments described herein can be implemented on any suitably configured digital device, e.g., a handheld graphing calculator, a smart phone, a tablet, a laptop, or a desktop computer system. FIGS. 9 and 10 are diagrams of two example digital devices.

FIG. 9 is an example of a handheld graphing calculator 900 configured to perform path tracing of mathematical plots as described herein. The handheld calculator 900 includes a display screen 904, and a keypad 902 that includes a touchpad 906. The display screen 904 can be used to display, among other things, information input to applications executing on the handheld graphing calculator 900 and various outputs of the applications. For example, the display screen 904 may be used to display the traces of plot paths as described herein. The display screen 904 may be, for example, an LCD display.

The keypad 902 allows a user to enter data and commands and to start and interact with applications executing on the handheld graphing calculator 900. The keypad 902 also includes an alphabetic keyboard for entering text. The touchpad 906 allows a user to interact with the display 904 by translating the motion and position of the user's fingers on the touchpad 906 to provide functionality similar to using an external pointing device, e.g., a mouse. A user may use the touchpad 906 to perform operations similar to using a pointing device on a computer system, e.g., scrolling the display 904 content, pointer positioning, selecting, highlighting, etc.

The handheld graphing calculator 900 includes a processor 901 coupled to a memory unit 912, e.g., a non-transitory computer-readable medium, which may include one or both of memory for program storage, e.g., read-only memory (ROM), and memory for non-persistent data and program storage, e.g., random-access memory (RAM). In some embodiments, the program storage memory stores software programs and the memory for non-persistent data stores intermediate data and operating results. An input/output port 908 provides connectivity to external devices, e.g., a wireless adaptor or wireless cradle. In one or more embodiments, the input/output port 908 is a bi-directional connection such as a mini-A USB port. Also included in the handheld graphing calculator 900 is an I/O interface 910. The I/O interface 910 provides an interface to couple input devices such as the touchpad 906 and the keypad 902 to the processor 901. In some embodiments, the handheld calculator 900 may also include an integrated wireless interface (not shown) or a port for connecting an external wireless interface (not shown).

In one or more embodiments, the memory unit 912 stores software instructions to be executed by the processor 901 to perform embodiments of plot path tracing as described herein. Further, in some such embodiments, the memory unit 912 stores software instructions of an operating system and other functionality that support embodiments of plot path tracing on the handheld graphing calculator 900. One example of such software is that available on the TI-Nspire™ series of graphing calculators available from Texas Instruments, Inc. The software is described, for example, in "TI-Nspire™ CX II Handhelds Guidebook," Texas Instruments, Inc., 2010-2019, which is incorporated by reference herein in its entirety.

FIG. 10 is an example of a computer system 1000 configured to perform path tracing of mathematical plots as described herein. The computer system 1000 includes a processing unit 1030 coupled to one or more input devices 1004 (e.g., a mouse, a keyboard, or the like), and one or more output devices, such as a display screen 1008. In some embodiments, the display screen 1008 may be touch screen, thus allowing the display screen 1008 to also function as an input device. The processing unit 1030 may be, for example, a desktop computer, a workstation, a laptop computer, a tablet, a dedicated unit customized for a particular application, or the like. The display screen 1008 may be any suitable visual display unit such as, for example, a computer monitor, an LED, LCD, or plasma display, a television, a high definition television, or a combination thereof. The display screen 1008 can be used, for example, to information input to applications executing on the processing unit 1030 and various outputs of the applications. For example, the display screen 1008 may be used to display the traces of plot paths as described herein.

The processing unit 1030 includes a processor 1018, memory 1014, a storage device 1016, a video adapter 1012, and an I/O interface 1010 connected by a bus. The bus may be one or more of any type of several bus architectures including a memory bus or memory controller, a peripheral bus, video bus, or the like. The processor 1018 may be any type of electronic data processor. For example, the processor 1018 may be a processor from Intel Corp., a processor from Advanced Micro Devices, Inc., a Reduced Instruction Set Computer (RISC), an Application-Specific Integrated Circuit (ASIC), or the like. The memory 1014, e.g., a non-transitory computer-readable medium, can be any type of system memory such as static random access memory (SRAM), dynamic random access memory (DRAM), synchronous DRAM (SDRAM), read-only memory (ROM), a combination thereof, or the like. Further, the memory 1014 can include ROM for use at boot-up, and DRAM for data storage for use while executing programs.

The storage device 1016, e.g., a non-transitory computer-readable medium, can include any type of storage device configured to store data, programs, and other information and to make the data, programs, and other information accessible via the bus. In one or more embodiments, the storage device 1016 stores software instructions to be executed by the processor 1018 to perform embodiments of plot path tracing described herein. In some such embodiments, the memory unit 1012 stores software instructions of student software that includes functionality supporting embodiments of plot path tracing described herein. One example of such student software is described in "TI-Nspire™ CX Student Software Guidebook," Texas Instruments, Inc., 2006-2019, which is incorporated by reference herein in its entirety.

The video adapter 1012 and the I/O interface 1010 provide interfaces to couple external input and output devices to the processing unit 1030. The processing unit 1030 also includes a network interface 1024. The network interface 1024 allows the processing unit 1030 to communicate with remote units via a network (not shown). The network interface 1024 may provide an interface for a wired link, such as an Ethernet cable or the like, or a wireless link. The computer system 1000 may also include other components not specifically shown. For example, the computer system 1000 may include power supplies, cables, a motherboard, removable storage media, cases, and the like.

Other Embodiments

While the disclosure has been described with respect to a limited number of embodiments, those skilled in the art, having benefit of this disclosure, will appreciate that other embodiments can be devised which do not depart from the scope disclosed herein.

For example, embodiments have been described herein in which a single slider is made available to the user. In some embodiments, two or more sliders may be displayed, one for each undefined variable in the mathematical expressions to be plotted/traced.

In another example, embodiments have been described herein in which a single type of mathematical expression, e.g., parametric equation, function, or polar equation, is plotted/traced. In some embodiments, the mathematical expressions present on the display screen can include more than one type of expression. In such embodiments, when multiple mathematical expression types are present, the user can select one type to be traced and any information on the display screen related to the other expression types is dimmed or "grayed out" while the expression(s) of the selected type are plotted/traced.

In another example, embodiments have been described herein in which the future path of a plot is shown during tracing of the plot path when the user selects the setting for showing the future path from a menu. In some embodiments, the user can use keys on the keyboard of the digital device in use to show or hide the future path, e.g., the up and down arrow keys can be used, while a plot path is being traced.

In another example, embodiments have been described herein in which tracing is illustrated for the plots of functions, polar equations, and parametric equations. In some embodiments, tracing may be provided for additional expression types, e.g., sequences. In some embodiments, tracing may be provided for a subset of the illustrated expression types. In some embodiments, tracing may be provided for different expression type(s).

Software instructions implementing all or portions of the plot tracing embodiments described herein may be initially stored in a non-transitory computer-readable medium and loaded and executed by one or more processors. In some cases, the software instructions may be distributed via removable non-transitory computer-readable media, via a transmission path from non-transitory computer-readable media on another digital system, etc. Examples of non-transitory computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the disclosure.

What is claimed is:

1. A method for path tracing of mathematical plots on a digital device, the method comprising:
  receiving, by a processor, at least one mathematical expression on the digital device, wherein the at least one mathematical expression includes an undefined variable;
  receiving, by the processor, a first input value from a graphical user interface displayed on a display screen coupled to the digital device, wherein the graphical user interface includes an upper limit and a lower limit;
  determining, by the processor, a plot of the at least one mathematical expression based on the first input value as the undefined variable;
  tracing in a direction, by the processor, a first portion of a path of the plot of the at least one mathematical expression on the display screen coupled to the digital device from a starting point, wherein the tracing of the first portion of the path comprises displaying the first portion of the path sequentially point by point as a value of an independent variable of the at least one mathematical expression changes over a domain of the independent variable;
  during the tracing of the first portion of the path, receiving, by the processor, a second input value from the graphical user interface, wherein the second input value is different than the first input value;
  in response to receiving the second input:
    determining, by the processor, a revised plot of the at least one mathematical expression based on the second input as the undefined variable;
    reversing, by the processor, the direction of tracing of the first portion of the path; and
    tracing, by the processor, a revised path of the revised plot of the at least one mathematical expression on the display screen;
  during the tracing of the first portion of the path, receiving, by the processor, a third input value from the graphical user interface, wherein the third input value is different than the first input value; and
  in response to receiving the third input:
    determining, by the processor, a third portion of the path, wherein the third portion originates from the start point and ends at an endpoint associated with the third input;
    displaying, by the processor, the third portion without tracing; and
    displaying, by the processor, a set of endpoint coordinates associated with the endpoint.

2. The method of claim 1, wherein the tracing the first portion of the path further comprises changing the value of the independent variable by a step size to determine each point of the first portion of the path.

3. The method of claim 2, wherein the step size is configurable by a user.

4. The method of claim 1, wherein the tracing of the first portion of the path further comprises displaying a future path of the plot on the display screen while the first portion of the path is traced.

5. The method of claim 4, wherein a user can choose whether or not the future path is to be displayed.

6. The method of claim 1, further comprising receiving and responding to trace control input.

7. The method of claim 6, wherein the trace control input indicates one of starting the tracing, halting the tracing, or resetting the tracing to a beginning.

8. The method of claim 6, wherein the trace control input indicates one of stepping the path forward by one point and stepping the path backward by one point.

9. The method of claim 6, wherein the trace control input indicates a change in a value of the undefined variable of the at least one mathematical expression, wherein the path is changed accordingly.

10. The method of claim 6, wherein the trace control input indicates that a point on the path is to be annotated.

11. The method of claim 1, further comprising receiving plot path trace settings, wherein received plot path trace settings include one or more of designation of graph type, designation of step size, designation to show a future path, and designation to show point coordinates of annotated points in the path.

12. A digital device comprising:
  a non-transitory computer-readable medium storing software instructions for path tracing of mathematical plots, wherein the software instructions comprise software instructions to:
    receive at least one mathematical expression on the digital device, wherein the at least one mathematical expression includes an undefined variable;
    receive a first input value from a graphical user interface displayed on a display screen coupled to the digital device, wherein the graphical user interface includes an upper limit and a lower limit;
    determine a plot of the at least one mathematical expression based on the first input value as the undefined variable;
    trace in a direction a first portion of a path of the plot of the at least one mathematical expression on the display screen coupled to the digital device from a starting point, wherein the tracing of the first portion of the path comprises displaying the first portion of the path sequentially point by point as a value of an independent variable of the at least one mathematical expression changes over a domain of the independent variable;

during the tracing of the first portion of the path, receive a second input value from the graphical user interface, wherein the second input value is different than the first input value;
in response to receiving the second input:
determine a revised plot of the at least one mathematical expression based on the second input as the undefined variable;
reverse the direction of tracing of the first portion of the path; and
trace a revised path of the revised plot of the at least one mathematical expression on the display screen;
during the tracing of the first portion of the path, receive a third input value from the graphical user interface, wherein the third input value is different than the first input value; and
in response to receiving the third input:
determine a third portion of the path, wherein the third portion originates from the start point and ends at an endpoint associated with the third input;
display the third portion without tracing; and
display a set of endpoint coordinates associated with the endpoint; and
at least one processor coupled to the non-transitory computer-readable medium to execute the software instructions.

13. The digital device of claim 12, wherein the software instructions to trace a path further comprise software instructions to change the value of the independent variable by a step size to determine each point of the first portion of the path.

14. The digital device of claim 13, wherein the step size is configurable by a user.

15. The digital device of claim 12, wherein the software instructions to trace a path further comprise software instructions to display a future path of the plot on the display screen while the first portion of the path is traced.

16. The digital device of claim 15, wherein a user can choose whether or not the future path is to be displayed.

17. The digital device of claim 12, wherein the software instructions further comprise software instructions to receive and respond to trace control input.

18. The digital device of claim 17, wherein the trace control input indicates one of starting the tracing, halting the tracing, or resetting the tracing to a beginning.

19. The digital device of claim 17, wherein the trace control input indicates one of stepping the path forward by one point and stepping the path backward by one point.

20. The digital device of claim 17, wherein the trace control input indicates a change in a value of the undefined variable of the at least one mathematical expression, wherein the path is changed accordingly.

21. The digital device of claim 17, wherein the trace control input indicates that a point on the path is to be annotated.

22. The digital device of claim 12, wherein the software instructions further comprise software instructions to receive plot path trace settings, wherein received plot path trace settings include one or more of designation of graph type, designation of step size, designation to show a future path, and designation to show point coordinates of annotated points in the path.

* * * * *